United States Patent
Ito et al.

(10) Patent No.: US 6,377,309 B1
(45) Date of Patent: Apr. 23, 2002

(54) IMAGE PROCESSING APPARATUS AND METHOD FOR REPRODUCING AT LEAST AN IMAGE FROM A DIGITAL DATA SEQUENCE

(75) Inventors: Masamichi Ito, Machida; Koji Takahashi, Chigasaki, both of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/480,179

(22) Filed: Jan. 10, 2000

(30) Foreign Application Priority Data

Jan. 13, 1999 (JP) .......................... 11-007035

(51) Int. Cl.[7] .................. H04N 5/46; H04N 5/445
(52) U.S. Cl. ................ 348/554; 348/558; 348/564; 348/565
(58) Field of Search .................. 348/553, 554, 348/555, 558, 563, 564, 565, 584; H04N 5/44, 3/27, 5/46, 5/445, 5/45

(56) References Cited

U.S. PATENT DOCUMENTS

| | | | | |
|---|---|---|---|---|
| 6,137,951 A | * | 10/2000 | Kawai et al. | 360/73.08 |
| 6,148,141 A | * | 11/2000 | Maeda et al. | 348/232 |
| 6,160,579 A | * | 12/2000 | Shiraiwa et al. | 348/224 |
| 6,256,071 B1 | * | 7/2001 | Hiroi | 348/553 |
| 6,273,535 B1 | * | 8/2001 | Inoue et al. | 347/2 |
| 6,285,408 B1 | * | 9/2001 | Choi | 348/555 |
| 6,336,155 B1 | * | 1/2002 | Ito et al. | 710/36 |
| 6,337,928 B1 | * | 1/2002 | Takahashi et al. | 382/236 |

OTHER PUBLICATIONS

U.S. application No. 08/315,254.
U.S. application No. 08/359,541.
U.S. application No. 09/451,870.

* cited by examiner

*Primary Examiner*—Sherrie Hsia
(74) *Attorney, Agent, or Firm*—Fitzpatrick, Cella, Harper & Scinto

(57) ABSTRACT

Upon implementing multi-functional TV broadcast and the like, it is desired to obtain information that pertains to a main image or that the user wants occasionally, if it does not pertain to the main image, in the form of an image as sub data with a small information size which is appended to the main image. For this purpose, MPEG4 data of sub TV information multiplexed in an MPEG2 datastream of the received and selected digital TV broadcast program is detected, and it is checked based on that detection result if MPEG4 data is included in the MPEG2 datastream. If MPEG4 data is included, an MPEG4 datastream is demultiplexed from the MPEG2 datastream, MPEG2 and MPEG4 data are respectively demultiplexed into sound, image, and system data, the demultiplexed data are decoded, and the output formats of MPEG2 image and sound data and MPEG4 scene and sound data are set.

15 Claims, 30 Drawing Sheets

FRAME UNIT ENCODING (VLVB CORE)

a, b, c, x : QUANTIZATION COEFFICIENT OF DC COMPONENT
A, B, C, X : QUANTIZATION COEFFICIENT OF AC COMPONENT

| PERSPECTIVE TRANSFORMATION | $x'=(ax+by+c)/(gx+hy+1)$<br>$y'=(dx+ey+f)/(gx+hy+1)$ |
|---|---|
| AFFINE TRANSFORMATION | $x'=ax+by+c$<br>$y'=dx+cy+f$ |
| EQUIDIRECTIONAL UPSCALING(a)/ROTATION($\theta$)/ MOVEMENT(c,f) | $x'=a\cos\theta\, x+a\sin\theta\, y+c$<br>$y'=-a\sin\theta\, x+a\cos\theta\, y+f$ |
| TRANSLATION | $x'=x+c$<br>$y'=y+f$ |

FIG. 13

| CODING SCHEME | | BIT RATE k bit/s |
|---|---|---|
| PARAMETRIC CODING | IL | 6 - 16 |
| | HVXC | 2 - 6 |
| CELP CODING | WB-CELP | 14 - 24 |
| | NB-CELP | 4 - 12 |
| TIME/FREQUENCY CONVERSION CODING(T/F CONVERSION) | AAC COMPATIBLE | 24 - 64 |
| | TwinVQ | 6 - 40 |
| SNHC | SA CODING (MUSIC TONE SYNTHESIS) | — |
| | TTS CODING (MUSIC TONE SYNTHESIS) | — |

CELP: Code Excited Linear Prediction
SNHC: Synthetic Natural Hybrid Coding

VS : Video Session
VO : Video Object
VOL : Video Object Layer
GOV : Group Of Video Object Plane
VOP : Video Object Plane

FIG. 17
(ERROR)
IRREVERSIBLE DECODING BY NORMAL VLC
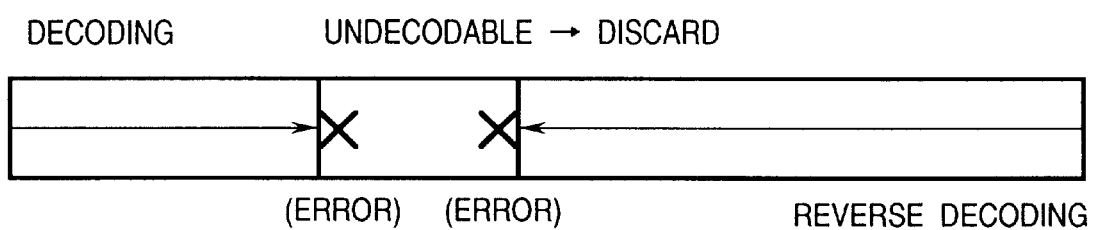
(ERROR) (ERROR) REVERSE DECODING

IMAGE PROCESSING APPARATUS AND METHOD FOR REPRODUCING AT LEAST AN IMAGE FROM A DIGITAL DATA SEQUENCE

BACKGROUND OF THE INVENTION

1. Field of the Invention

The present invention relates to an image processing apparatus and method and, more particularly, to an image processing apparatus and method for reproducing at least an image from a digital data sequence such as a Motion Picture Experts Group layer 2 (MPEG2) datastream.

2. Description of Related Art

In recent years, digital television broadcast using a satellite broadcast or cable broadcast system has been started. Upon implementation of digital broadcast, many effects such as improvement of qualities of image and sound data including audio data, increases in the number of kinds and volume of programs exploiting various compression techniques, provision of new services such as an interactive service and the like, advance of the receiving pattern, and the like, are expected.

FIG. 1 is a block diagram showing the arrangement of a digital broadcast receiver 10 using satellite broadcast.

A television (TV) broadcast wave transmitted from a broadcast satellite is received by an antenna 1. The received TV broadcast wave is tuned by a tuner 2 to demodulate TV information. After that, an error correction process, and a charging process, descramble process, and the like if necessary are done, although not shown. Various data multiplexed as the TV information are demultiplexed by a multiplexed signal demultiplexer 3. The TV information is demultiplexed into image information, sound information, and other additional data. The demultiplexed data are decoded by a decoder 4. Of the decoded data, image information and sound information are converted into analog data by a D/A converter 5, and these data are reproduced by a television receiver (TV) 6. On the other hand, the additional data has a role of program sub-data, and is associated with various functions.

Furthermore, a VTR 7 is used to record/reproduce the received TV information. The receiver 10 and VTR 7 are connected via a digital data interface such as IEEE 1394 or the like. The VTR 7 has a recording format such as a digital recording system, and records TV information as bitstream data based on, e.g., D-VHS. Note that TV information of digital TV broadcast can be recorded not only by bitstream recording based on D-VHS, but also by the digital Video (DV) format as another home-use digital recording scheme, or digital recording apparatuses using various disk media. In such case, format conversion may often be required.

The aforementioned digital TV broadcast and digital recording apparatus mainly adopt a data format encoded by MPEG2.

However, in order to display a TV program table on the TV 6 in ground wave broadcast or the aforementioned digital TV broadcast, only a method of simply displaying a main image sent from a broadcast station is available. Teletext is known as an example for displaying sub information appended to the main image. However, teletext can provide limited information such as text information or the like, and cannot handle any image.

A TV receiver that displays a plurality of channels of images on multi-windows is available. However, the individual images are sent as a main image with a large information size.

Upon implementing multi-functional TV broadcast or the like, it is desired to obtain information that pertains to a main image or that the user wants occasionally, if it does not pertain to the main image, in the form of an image (which may include sound data) as sub data with a small information size which is appended to the main image. However, such technique is not realized yet.

SUMMARY OF THE INVENTION

The present invention has been made to solve the aforementioned problems and to provide a function of reproducing information which pertains to a main image or which is desired occasionally, even if it does not pertain to the main image, at least in the form of an image.

In order to achieve the above object, a preferred embodiment of the present invention discloses an image processing apparatus comprising inputting means for inputting a data stream of MPEG 2; detecting means for detecting a data stream of MPEG 4 inserted into the data stream of MPEG 2; separating means for separating the data stream of MPEG2 and/or the data stream of MPEG 4 to a plurality of data; decoding means for decoding the separated data; and controlling means for controlling at least reproduction of image data decoded by said decoding means based on a result of said detecting means.

Also, a preferred embodiment of the present invention discloses an image processing method comprising the steps of inputting a data stream of MPEG 2; detecting a data stream of MPEG 4 inserted into the data stream of MPEG 2; separating the data stream of MPEG2 and/or the data stream of MPEG 4 to a plurality of data; decoding the separated data; and controlling at least reproduction of image data decoded by said decoding means based on a result of the detection.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a table showing different types of MPEG4 audio coding schemes;

FIG. 17 is a view for explaining reversible decoding;

DESCRIPTION OF THE PREFERRED EMBODIMENTS

Figure 1:
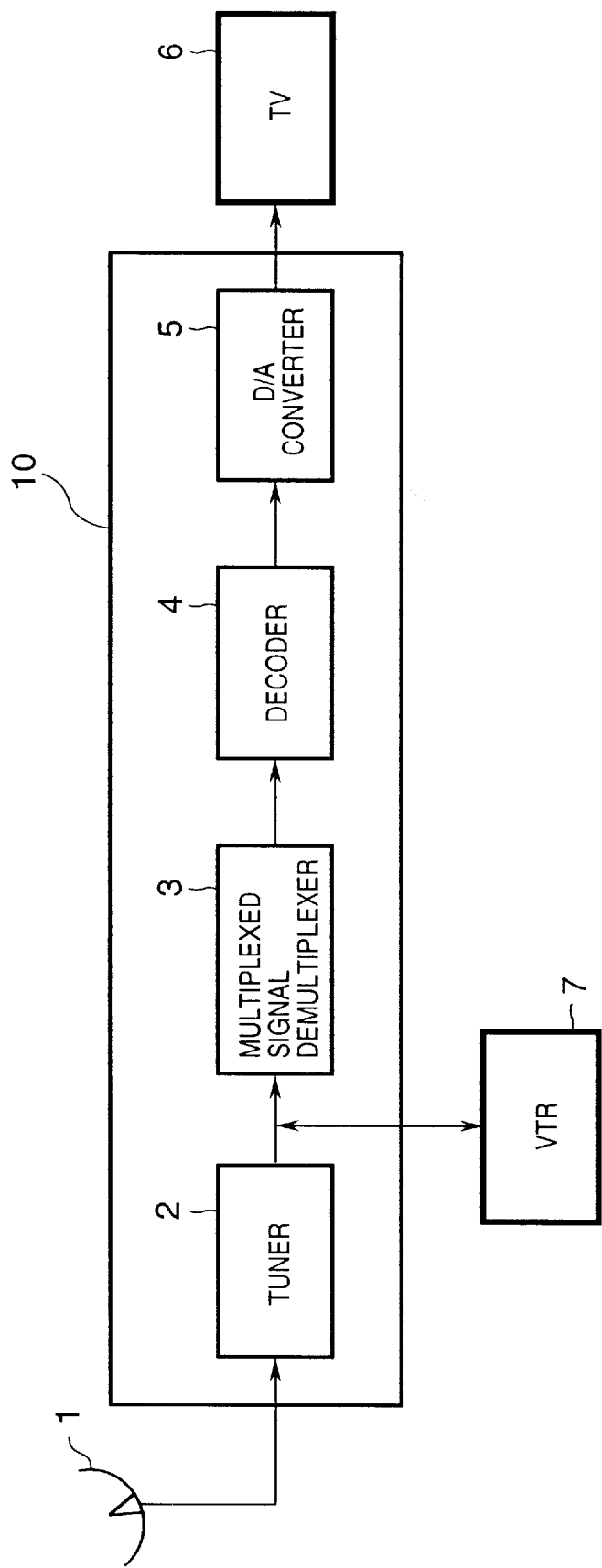
FIG. 1 is a block diagram showing the arrangement of a digital broadcast receiver using satellite broadcast.

The preferred embodiments of an image processing apparatus and method for receiving a broadcast according to the present invention will now be described in detail with reference to the accompanying drawings.

Outline

In this embodiment, main information of TV broadcast is sent by efficiently multiplexing sound data including image and/or sound data in a predetermined field in the main information as sub information, and the receiving side receives and reproduces the main information and sub information. As the data formats of the main information and sub information, main image information uses an MPEG2 datastream of digital TV broadcast, and the sub information uses an MPEG4 datastream which has been standardized in recent years and has very high transmission efficiency.

According to this embodiment, image and sound data can be sent using sub information multiplexed in the main information, and the information that the user desires can be provided in the form of an image (sound data including audio data may be added). Furthermore, the visual effect can be improved.

Moreover, when MPEG2 and MPEG4 are used as the data formats, compatibility with MPEG2 as the current digital TV broadcast system can be easily implemented, and existing MPEG2 contents can be effectively used. Also, MPEG4 that handles image and sound data in units of objects is an optimal data format as the data format of sub information.

Note that this embodiment is not limited to digital TV broadcast, and can also be applied to package media such as a Digital Video Disc (DVD), and the like.

Outline of MPEG4
[Overall Configuration of Standards]

The Motion Picture Experts Group layer 4 (MPEG 4) standards consist of four major items. Three out of these items are similar to those of MPEG2, i.e., visual part, audio part, and system part.

Visual Part

This part specifies object coding that processes a photo image, synthetic image, moving image, still image, and the like as standards. Also, this part includes a coding scheme, sync reproducing function, and hierarchical coding, which are suitable for correction or recovery of transmission path errors. Note that "video" means a photo image, and "visual" includes a synthetic image.

Audio Part

This part specifies object coding for natural sound, synthetic sound, effect sound, and the like as standards. The video and audio parts specify a plurality of coding schemes, and coding efficiency is improved by appropriately selecting a compression scheme suitable for the feature of each object.

System Part

This part specifies multiplexing of encoded video and sound objects, and their demultiplexing. Furthermore, this part includes control and re-adjustment functions of buffer memories and time bases. Video and sound objects encoded in the visual and audio parts are combined into a multiplexed stream of the system part together with scene configuration information that describes the positions, appearance and disappearance times of objects in a scene. As a decoding process, the individual objects are demultiplexed/decoded from a received bitstream, and a scene is reconstructed on the basis of the scene configuration information.

[Object Coding]

In MPEG2, coding is done in units of frames or fields. However, in order to re-use or edit contents, MPEG4 processes video and audio data as objects. The objects include:

sound photo image (background image: two-dimensional still image)

photo image (principal object image: without background)

synthetic image character image

Figure 2:
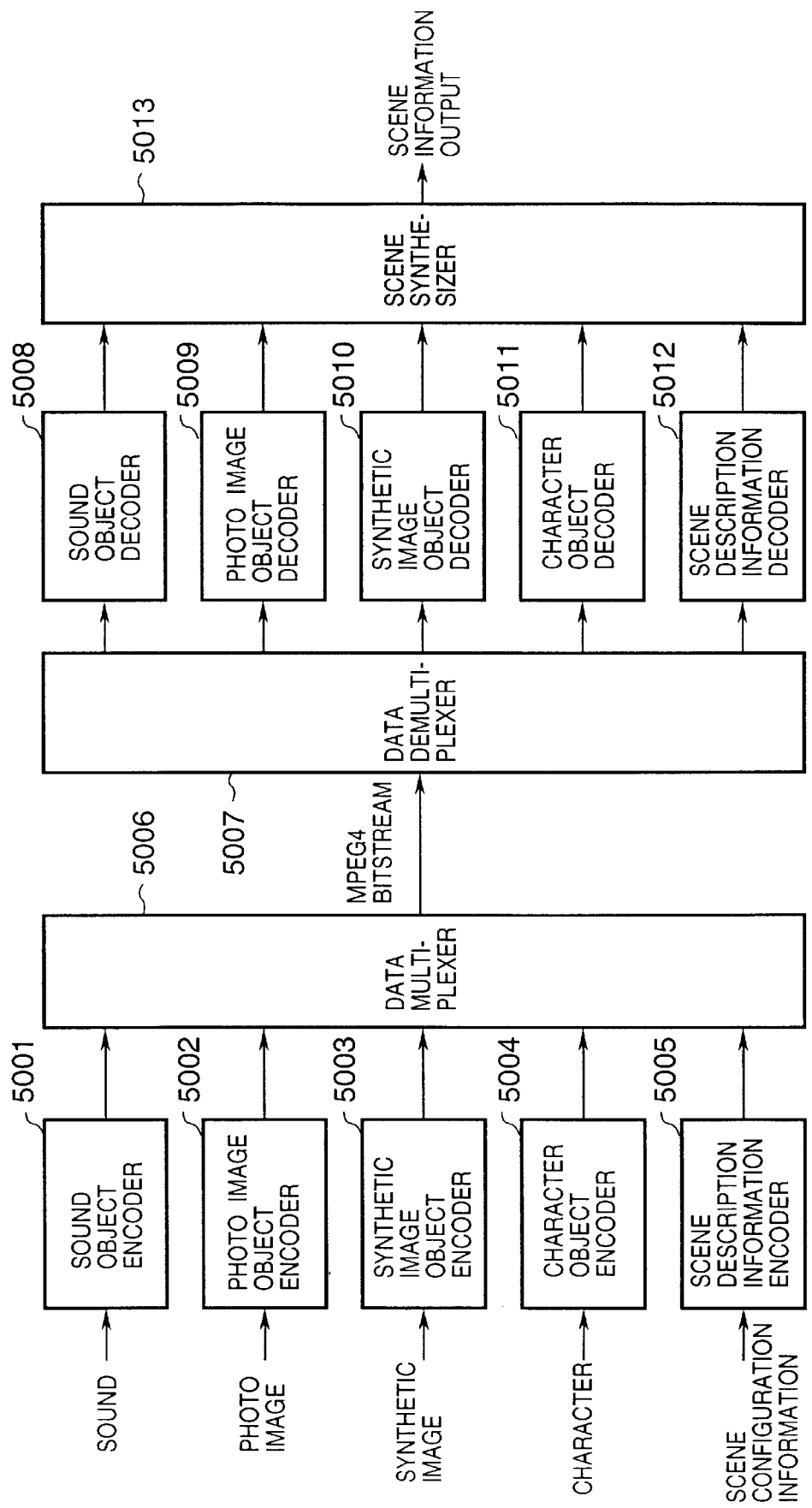
FIG. 2 is a block diagram showing the arrangement that simultaneously receives and encodes a plurality of kinds of objects.

FIG. 2 shows the system arrangement upon simultaneously receiving and encoding these objects. A sound object encoder 5001, photo image object encoder 5002, synthetic image object encoder 5003, and character object encoder 5004 respectively encode objects. Simultaneously with such encoding, scene configuration information that describes relations of the individual objects in a scene is encoded by a scene description information encoder 5005. The encoded object information and scene description information undergo an encode process to an MPEG4 bitstream by a data multiplexer 5006.

In this manner, the encode side defines a plurality of combinations of visual and audio objects to express a single scene (frame). As for visual objects, a scene that combines a photo image and a synthetic image such as computer graphics or the like can be synthesized. With the aforementioned configuration, using, e.g., a text-to-speech synthesis function, an object image and its audio data can be synchronously reproduced. Note that the bitstream is transmitted/received or recorded/reproduced.

A decode process is a process opposite to the aforementioned encode process. A data demultiplexer 5007 demultiplexes the MPEG4 bitstream into objects, and distributes the objects. The demultiplexed sound, photo image, synthetic image, character objects, and the like are decoded into object data by corresponding decoders 5008 to 5011. Also, the scene description information is simultaneously decoded by a decoder 5012. A scene synthesizer 5013 synthesizes an original scene using the decoded information.

On the decode side, the positions of visual objects contained in a scene, the order of audio objects, and the like can be partially changed. The object position can be changed by, e.g., dragging a mouse, and the language can be changed when the user changes an audio object.

In order to synthesize a scene by freely combining a plurality of objects, the following four items are specified:

Object Coding

Visual objects, audio objects, and AV (audiovisual) objects as their combination are to be encoded.

Scene Synthesis

In order to specify scene configuration information and a synthesis scheme that synthesize a desired scene by combining visual, audio and AV objects, a language obtained by modifying Virtual Reality Modeling Language (VRML) is used.

Multiplexing and Synchronization

The format and the like of a stream (elementary stream) that multiplexes and synthesizes the individual objects and the like are specified. The QOS (Quality of Service) upon delivering this stream onto a network or storing it in a recording apparatus can also be set. QOS parameters include transmission path conditions such as a maximum bit rate, bit error rate, transmission scheme, and the like, decoding capability, and the like.

User Operation (Interaction)

A scheme for synthesizing visual and audio objects on the user terminal side is defined. The MPEG4 user terminal demultiplexes data sent from a network or a recording apparatus into elementary streams, and decodes them in units of objects. Also, the terminal reconstructs a scene from a plurality of encoded data on the basis of scene configuration information sent at the same time.

Figure 3:
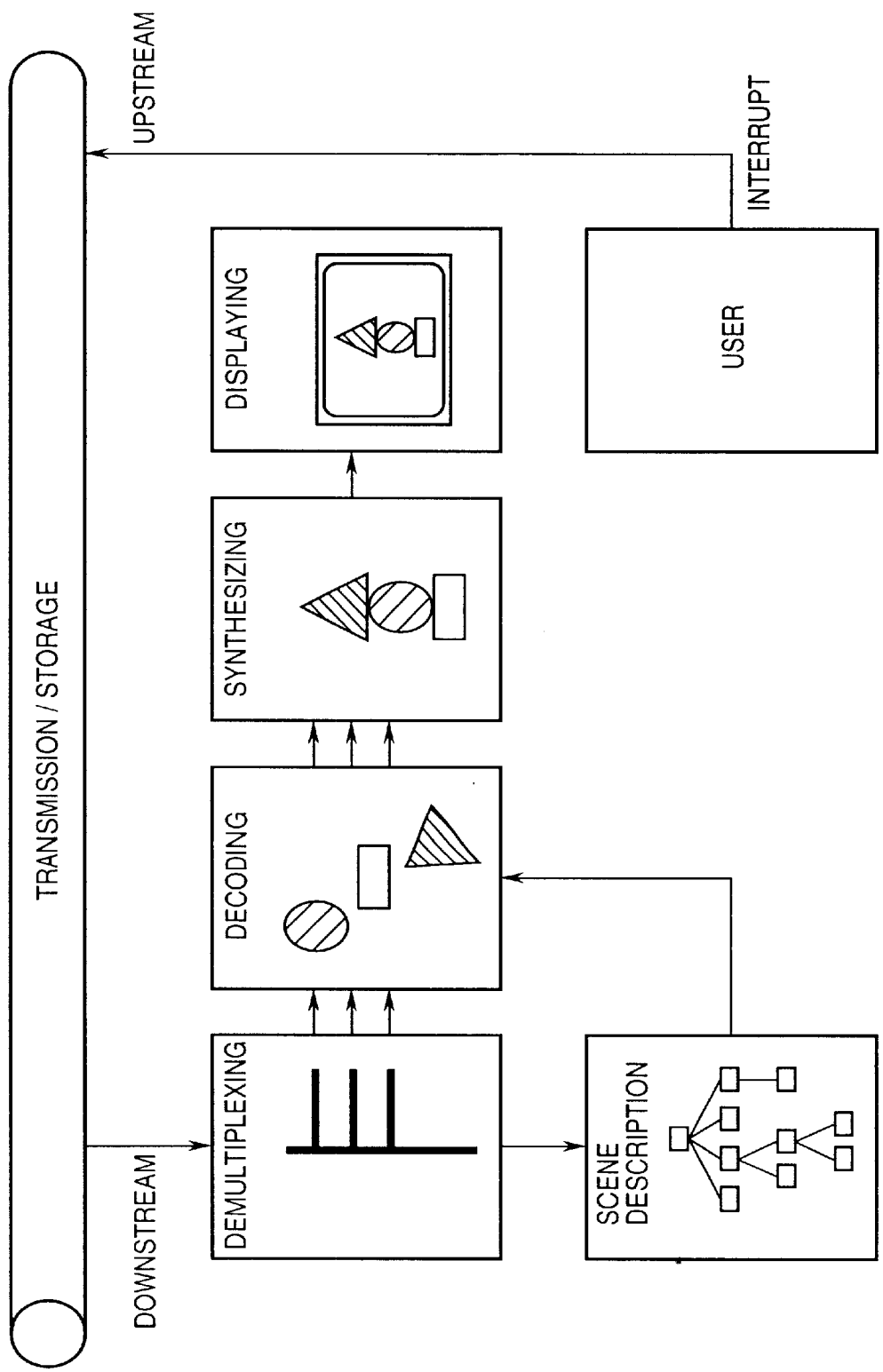
FIG. 3 is a view showing the arrangement of a system that takes user operation (edit) into consideration.
Figure 4:
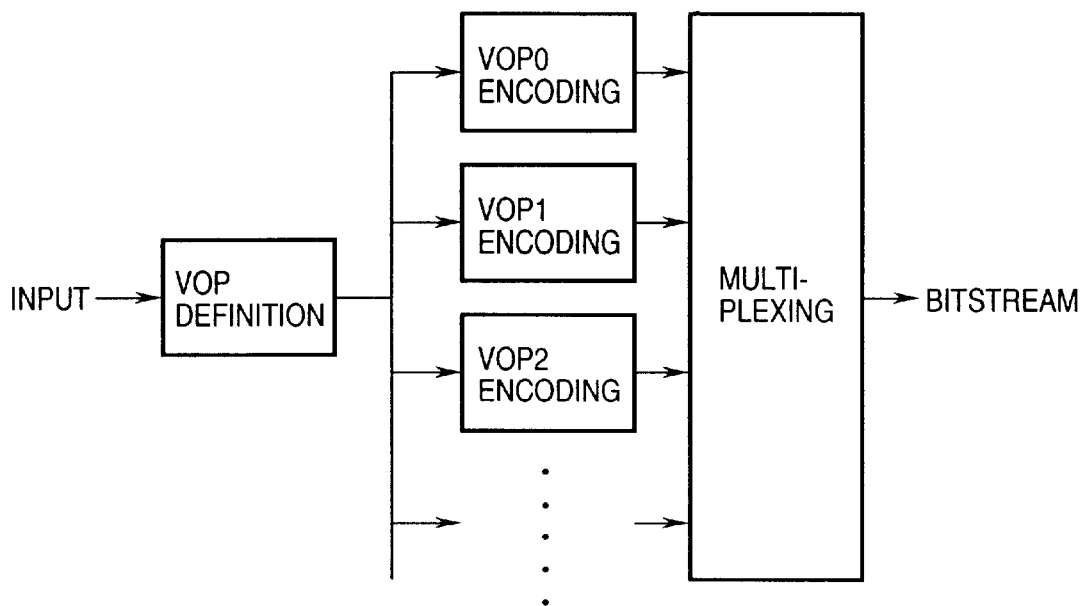
FIG. 4 is a block diagram of a VOP processor that pertains to a video object on the encoder side.
Figure 5:
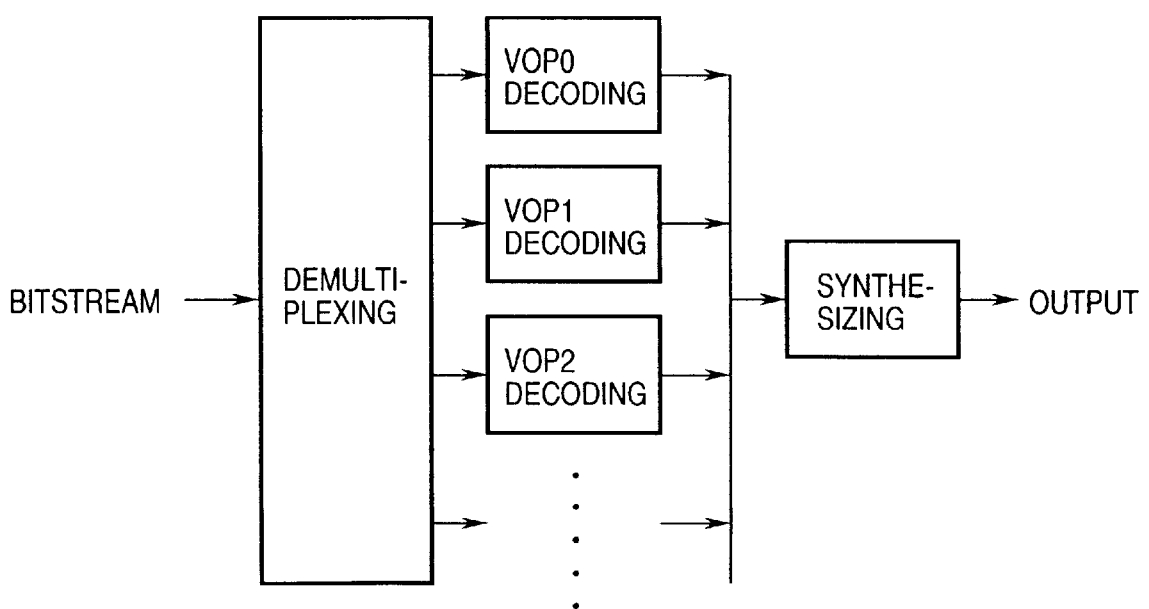
FIG. 5 is a block diagram of a VOP processor that pertains to a video object on the decoder side.

FIG. 3 shows the arrangement of a system that takes user operation (edit) into consideration. FIG. 4 is a block diagram of a VOP processor that pertains to a video object on the encoder side, and FIG. 5 is a block diagram on the decoder side.

Figure 6:
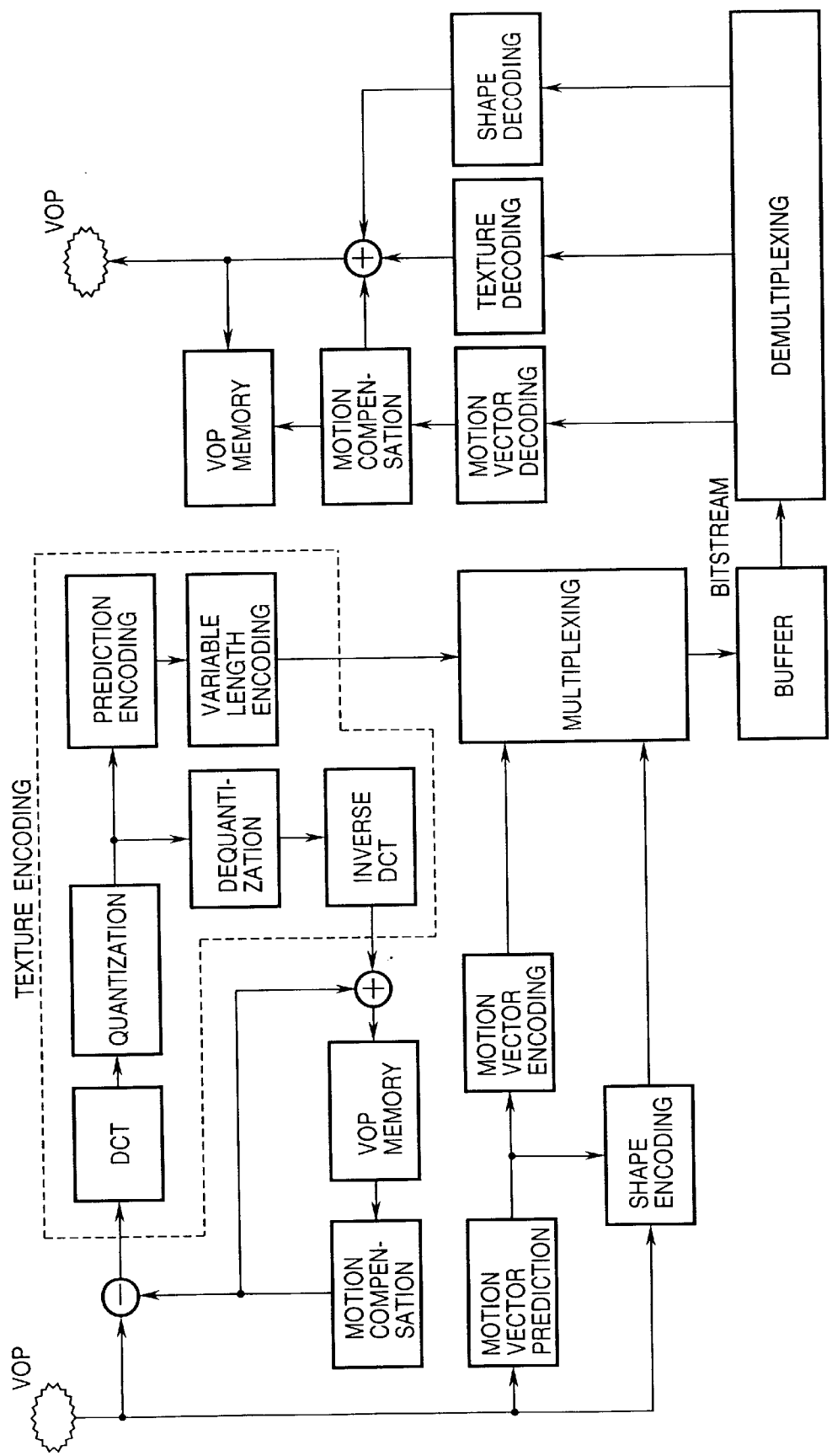
FIG. 6 is a block diagram showing the overall arrangement for encoding and decoding a VOP.

Upon encoding a video in MPEG4, a video object to be encoded is separated into its shape and texture. This unit video data is called a video object plane (VOP). FIG. 6 is a block diagram showing the overall arrangement for encoding and decoding a VOP.

Figure 7A:
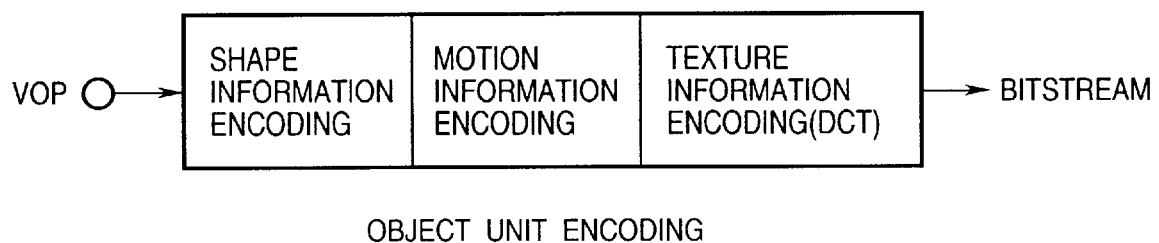
FIGS. 7A and 7B show information forming a VOP.

For example, when an image is composed of two objects, i.e., a person and background, each frame is segmented into two VOPs which are encoded. Each VOP is formed by shape information, motion information, and texture information of an object, as shown in FIG. 7A. On the other hand, a decoder demultiplexes a bitstream into VOPs, decodes the individual VOPs, and synthesizes them to form a scene.

Figure 7B:
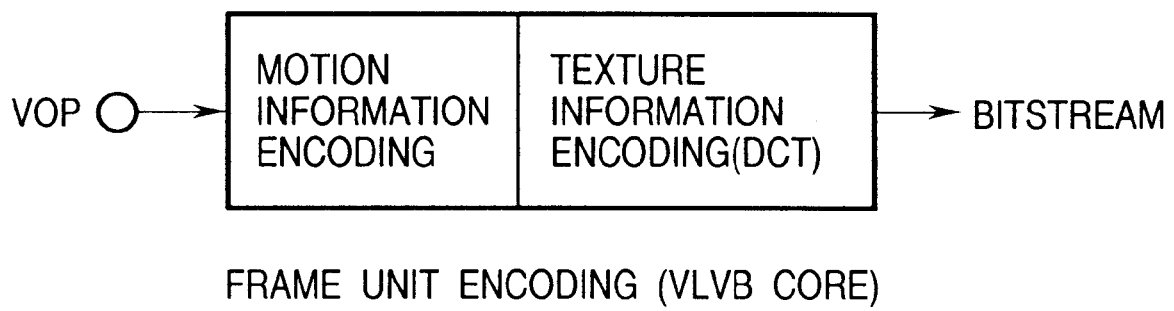

In this manner, since the VOP structure is adopted, when a scene to be processed is composed of a plurality of video objects, they can be segmented into a plurality of VOPs, and those VOPs can be individually encoded/decoded. When the number of VOPs is 1, and an object shape is a rectangle, conventional frame unit coding is done, as shown in FIG. 7B.

VOPs include those coded by three different types of predictive coding, i.e., an intra coded VOP (I-VOP), a forward predicted VOP (P-VOP), and a bi-directionally predicted (B-VOP). The prediction unit is a 16×16 pixel macroblock (MB).

Bi-directional predictive coding (B-VOP) is a scheme for predicting a VOP from both past and future VOPs like in B-picture of MPEG1 and MPEG2. Four different modes, i.e., direct coding, forward coding, backward coding, and bi-directional coding can be selected in units of macroblocks. This mode can be switched in units of MBs or blocks. Bi-directional prediction is implemented by scaling the motion vectors of P-VOPs.

[Shape Coding]

In order to handle an image in units of objects, the shape of the object must be known upon encoding and decoding. In order to express an object such as glass through which an object located behind it is seen, information that represents transparency of an object is required. A combination of the shape information and transparency information of the object will be referred to as shape information hereinafter. Coding of the shape information will be referred to as shape coding hereinafter.

[Size Conversion Process]

Binary shape coding is a scheme for coding a boundary pixel by checking if each pixel is located outside or inside an object. Hence, as the number of pixels to be encoded is smaller, the generated code amount can be smaller. However, reducing the macroblock size to be encoded means deteriorated original shape code at the receiving side. Hence, the degree of deterioration of original information is measured by size conversion, and as long as the size conversion error stays equal to or smaller than a predetermined threshold value, the smallest possible macroblock size is selected. As examples of the size conversion ratio, an original size, ½ (vertical and horizontal), and ¼ (vertical and horizontal) are available.

Shape information of each VOP is described by an 8-bit α value, which is defined as follows.

α=0: outside the VOP of interest

α=1 to 254: display in semi-transparent state together with another VOP

α=255: display range of only the VOP of interest

Binary shape coding is done when the α value assumes 0 or 255, and a shape is expressed by only the interior and exterior of the VOP of interest. Multi-valued shape coding is done when the α value can assume all values from 0 to 255, and a state wherein a plurality of VOPs are superposed on each other in a semi-transparent state can be expressed.

As in texture coding, motion-compensated prediction with unit pixel precision is done in units of 16×16 pixel blocks. Upon intra coding the entire object, shape information is not predicted. As a motion vector, the difference of a motion vector predicted from a neighboring block is used. The obtained difference value of the motion vector is encoded and multiplexed on a bitstream. In MPEG4, motion-compensated predicted shape information in units of blocks undergoes binary shape coding.

Feathering

In addition, even in case of a binary shape, when a boundary is to be smoothly changed from opaque to transparent, feathering (smoothing of a boundary shape) is used. As feathering, a linear feathering mode for linearly interpolating a boundary value, and a feathering filter mode using a filter are available. For a multi-valued shape with constant opacity, a constant alpha mode is available, and can be combined with feathering.

[Texture Coding]

Texture coding encodes the luminance and color difference components of an object, and processes in the order of DCT (Discrete Cosine Transform), quantization, predictive coding, and variable-length coding in units of fields/frames.

The DCT uses an 8×8 pixel block as a processing unit. When an object boundary is located within a block, pixels outside the object are padded by the average value of the object. After that, a 4-tap two-dimensional filter process is executed to prevent any large pseudo peaks from being generated in DCT coefficients.

Quantization uses either an ITU-T recommendation H.263 quantizer or MPEG2 quantizer. When the MPEG2 quantizer is used, nonlinear quantization of DC components and frequency weighting of AC components can be implemented.

Intra-coding coefficients after quantization undergo predictive coding between neighboring blocks before variable-length coding to remove redundancy components. Especially, in MPEG4, both DC and AC components undergo predictive coding.

Figure 8:
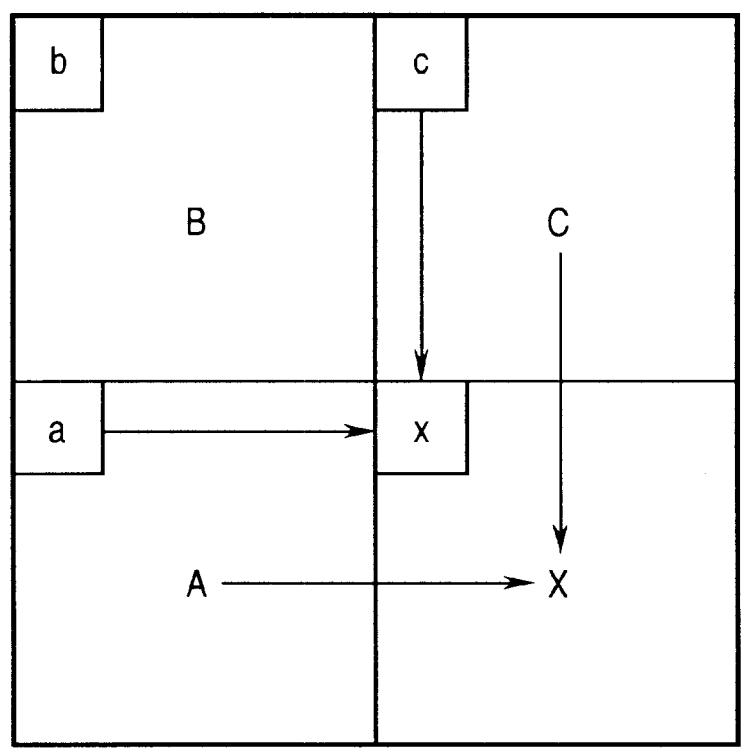
FIG. 8 is a view for explaining AC/DC predictive coding in texture coding.

AC/DC predictive coding in texture coding checks the difference (gradient) between corresponding quantization coefficients between the block of interest and its neighboring block, and uses a smaller quantization coefficient in prediction, as shown in FIG. 8. For example, upon predicting DC coefficient x of the block of interest, if corresponding DC coefficients of the neighboring block are a, b, and c, the DC coefficient to be used in prediction is determined as per:

if $|a-b|<|b-c|$, DC coefficient c is used in prediction; or
if $|a-b|\geq|b-c|$, DC coefficient a is used in prediction.

Upon predicting AC coefficient x of the block of interest as well, a coefficient to be used in prediction is selected in the same manner as described above, and is normalized by a quantization scale value QP of each block.

Predictive coding of DC components checks the difference (vertical gradient) between DC components of the block of interest and its vertically neighboring block and the difference (horizontal gradient) between DC components of the block of interest and its horizontally neighboring block among neighboring blocks, and encodes the difference from the DC component of the block in a direction with a smaller gradient as a prediction error.

Predictive coding of AC components uses corresponding coefficients of neighboring blocks in correspondence with predictive coding of DC components. However, since quantization parameter values may be different among blocks, the difference is calculated after normalization (quantization step scaling). The presence/absence of prediction can be selected in units of macroblocks.

After that, AC components are zigzag-scanned, and undergo three-dimensional (Last, Run, and Level) variable-length coding. Note that Last is a 1-bit value indicating the end of coefficients other than zero, Run is a zero run length, and Level is a non-zero coefficient value.

Variable-length coding of DC components encoded by intra coding uses either a DC component variable-length coding table or AC component variable-length coding table.

[Motion Compensation]

In MPEG4, a video object plane (VOP) having an arbitrary shape can be encoded. VOPs include those coded by three different types of predictive coding, i.e., an intra coded VOP (I-VOP), a forward predicted VOP (P-VOP), and a bi-directionally predicted (B-VOP), as described above, and the prediction unit uses a macroblock of 16 lines×16 pixels or 8 lines×8 pixels. Hence, some macroblocks extend across the boundaries of VOPs. In order to improve the prediction efficiency at the VOP boundary, macroblocks on a boundary undergo padding and polygon matching (matching of only an object portion).

[Wavelet Coding]

The wavelet transform is a transformation scheme that uses a plurality of functions obtained by upscaling, downscaling, and translating a single isolated wave function as transformation bases. A still image coding mode (Texture Coding Mode) using this wavelet transform is suitable as a high image quality coding scheme having various spatial resolutions ranging from high resolutions to low resolutions, when an image obtained by synthesizing a computer graphics (CG) image and natural image is to be processed. Since wavelet coding can simultaneously encode an image without segmenting it into blocks, block distortion can be prevented from being generated even at a low bit rate, and mosquito noise can be reduced. In this manner, the MPEG4 still image coding mode can adjust the trade off among broad scalability from low-resolution, low-quality images to high-resolution, high-quality images, complexity of processes, and coding efficiency in correspondence with applications.

[Hierarchical Coding (Scalability)]

Figure 9A:
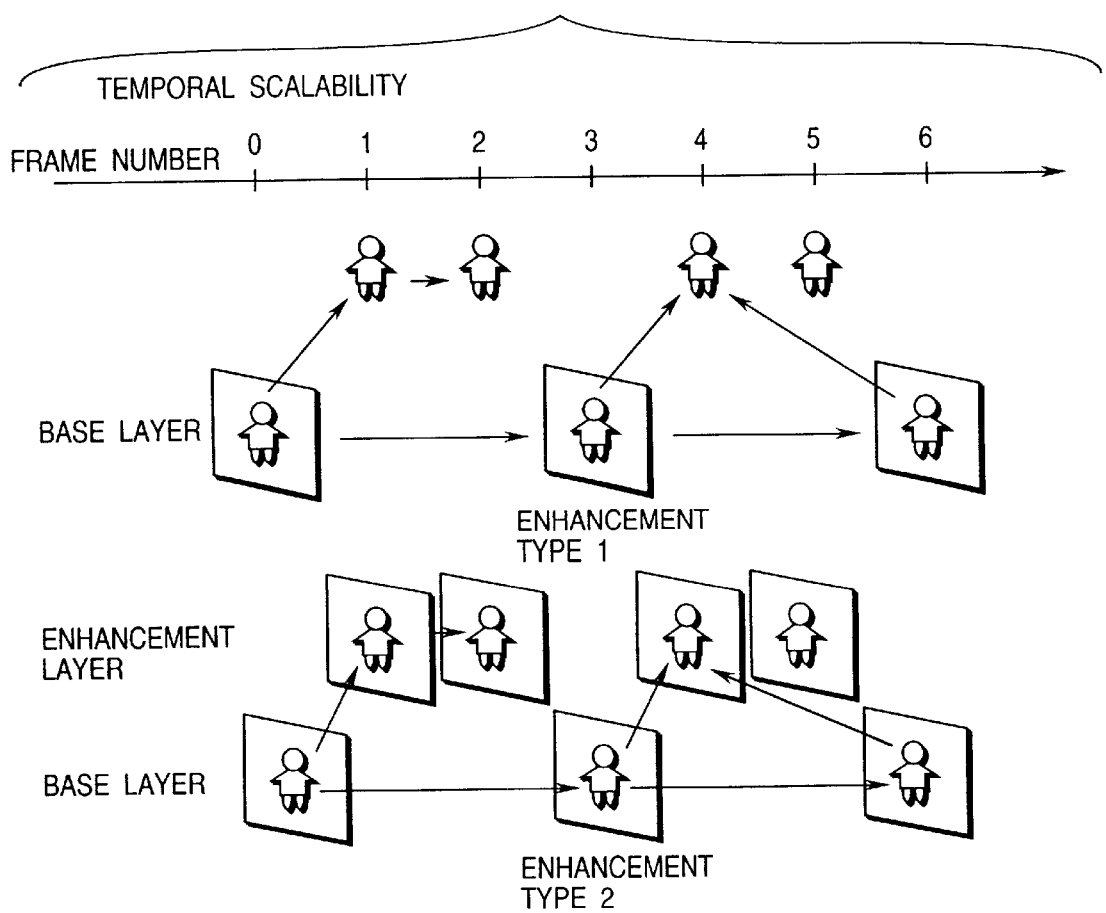
FIGS. 9A and 9B are views for explaining the hierarchical structure of a syntax that implements scalability.
Figure 9B:
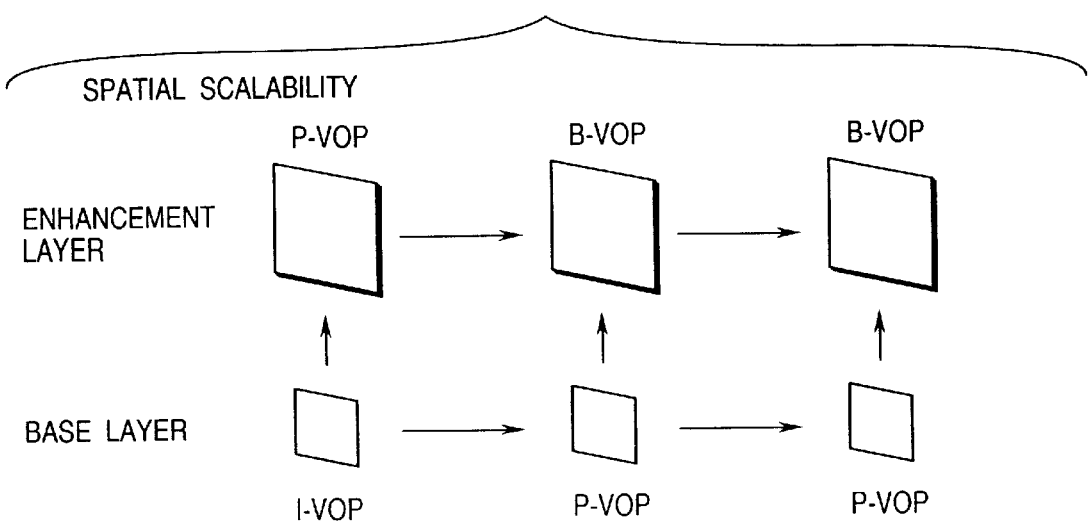

In order to implement scalability, the hierarchical structure of a syntax is constructed, as shown in FIGS. 9A and 9B. Hierarchical coding is implemented by using, e.g., base layers as lower layers, and enhancement layers as upper layers, and coding "difference information" that improves the image quality of a base layer in an enhancement layer. In case of spatial scalability, "base layer+enhancement layer" expresses a high-resolution moving image.

Furthermore, scalability has a function of hierarchically improving the image quality of the entire image, and improving the image quality of only an object region in the image. For example, in case of temporal scalability, a base layer is obtained by encoding the entire image at a low frame rate, and an enhancement layer is obtained by encoding data that improves the frame rate of a specific object in the image.

Temporal Scalability

Temporal scalability shown in FIG. 9A specifies a hierarchy of frame rates, and can increase the frame rate of an object in an enhancement layer. The presence/absence of hierarchy can be set in units of objects. There are two types of enhancement layers: type 1 is composed of a portion of an object in a base layer, and type 2 is composed of the same object as a base layer.

Spatial Scalability

Spatial scalability shown in FIG. 9B specifies a hierarchy of spatial resolutions. A base layer allows downsampling of an arbitrary size, and is used to predict an enhancement layer.

[Sprite Coding]

A sprite is a two-dimensional object such as a background image or the like in a three-dimensional spatial image, which allows the entire object to integrally express movement, rotation, deformation, and the like. A scheme for coding this two-dimensional object is called sprite coding.

Sprite coding is classified into four types, i.e., static/dynamic and online/offline: a static sprite obtained by direct transformation of a template object by an arrangement that sends object data to a decoder in advance and sends only global motion coefficients in real time; a dynamic sprite obtained by predictive coding from a temporally previous sprite; an offline sprite encoded by intra coding (I-VOP) in advance and sent to the decoder side; and an online sprite simultaneously generated by an encoder and decoder during coding.

Techniques that have been examined in association with sprite coding include static sprite coding, dynamic sprite coding, global motion compensation, and the like.

Static Sprite Coding

Figures 10A, 10B:
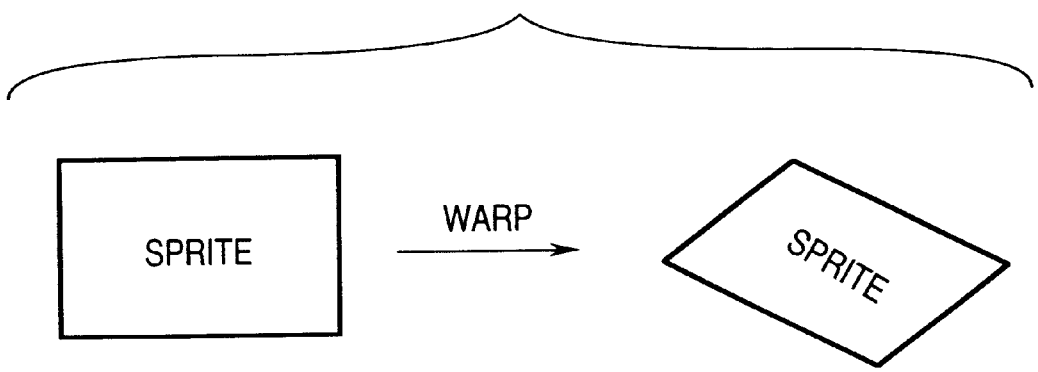
FIG. 10A is a view for explaining warp.
FIG. 10B is a table for explaining different types of warp.

Static sprite coding is a method of encoding the background (sprite) of the entire video clip in advance, and expressing an image by geometric transformation of a portion of the background. The extracted partial image can express various deformations such as translation, upscaling/ downscaling, rotation, and the like. As shown in FIG. 10A, viewpoint movement in a three-dimensional space expressed by movement, rotation, upscaling/downscaling, deformation, or the like of an image is called "warp".

There are four types of warp: perspective transformation, affine transformation, equidirectional upscaling (a)/rotation (θ)/movement (c, f), and translation, which are respectively given by equations in FIG. 10B. Also, coefficients of equations shown in FIG. 10B define movement, rotation, upscaling/downscaling, deformation, and the like. A sprite is generated offline before the beginning of coding.

Figure 11:
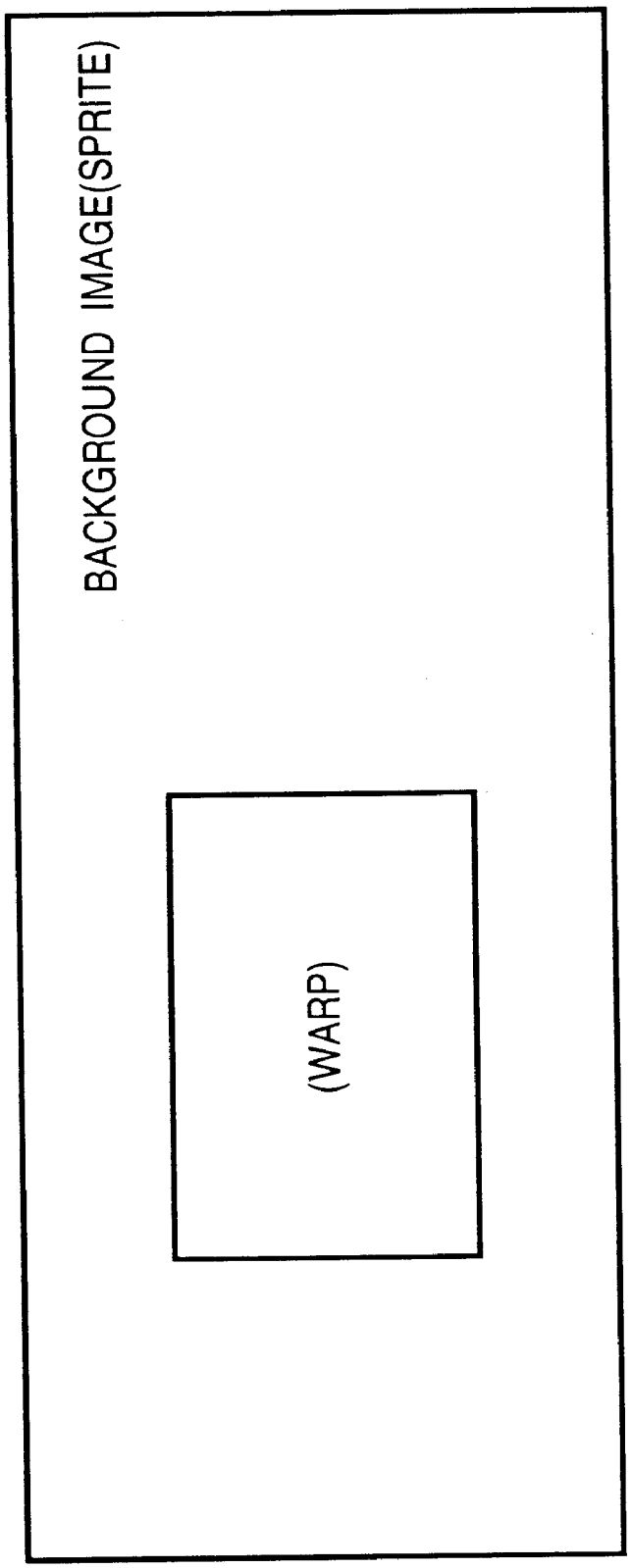
FIG. 11 is a view for explaining warp.

In this manner, static sprite coding is implemented by extracting a partial region of a background image and warping the extracted region. A partial region included in a sprite (background) image shown in FIG. 11 is warped. For example, the background image is an image of, e.g., a stand in a tennis match, and the region to be warped is an image including an object with motion such as a tennis player. In static sprite coding, only geometric transform parameters are encoded, but prediction errors are not encoded.

Dynamic Sprite Coding

In static sprite coding, a sprite is generated before coding. By contrast, in dynamic sprite coding, a sprite can be updated online during coding. Also, dynamic sprite coding encodes prediction errors unlike static sprite coding.

Global Motion Compensation (GMC)

Global motion compensation is a technique for implementing motion compensation by expressing motion of the entire object by one motion vector without segmenting it into blocks, and is suitable for motion compensation of a rigid body. Also, a reference image serves as an immediately preceding decoded image in place of a sprite, and prediction errors are coded like in static sprite coding. However, unlike static and dynamic sprite coding processes, neither a memory for storing a sprite nor shape information are required. Global motion compensation is effective for expressing motion of the entire frame and an image including zoom.

[Scene Description Information]

Objects are synthesized based on scene configuration information. In MPEG4, configuration information which is used to synthesize the individual objects into a scene is sent. Upon receiving the individually encoded objects, they can be synthesized into a scene the transmitting side intended using the scene configuration information.

Figure 12:
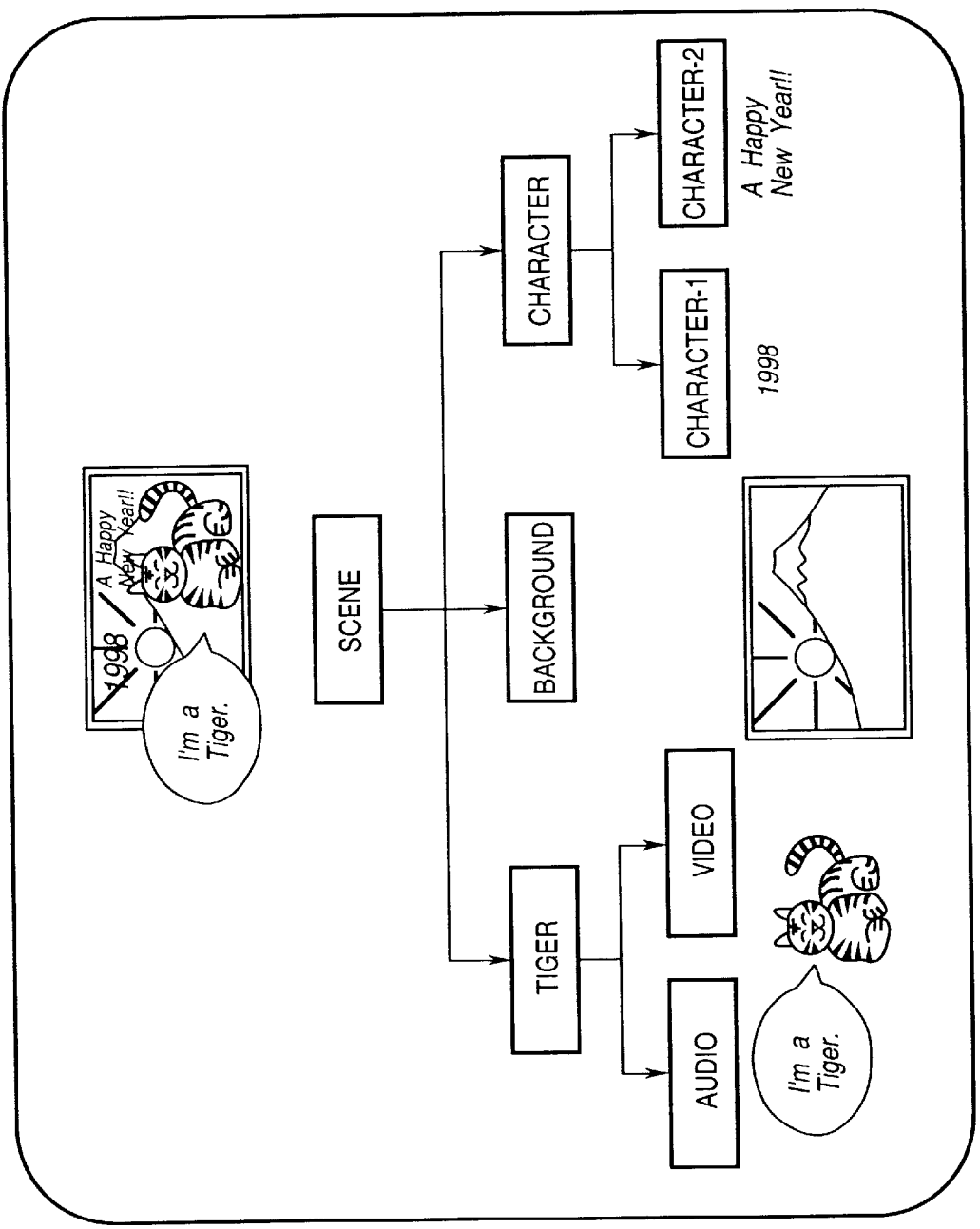
FIG. 12 is a view showing an example of the format of scene description information.

The scene configuration information contains the display times and positions of the objects, which are described as nodes in a tree pattern. Each node has relative time information and relative spatial coordinate position information on the time base with respect to a parent node. As a language that describes the scene configuration information, BIFS (Binary Format for Scenes) obtained by modifying VRML, and AAVS (Adaptive Audio-Visual Session Format) using Java™ are available. BIFS is a binary description format of MPEG4 scene configuration information. AAVS is developed based on Java™, has a high degree of freedom, and compensates for BIFS. FIG. 12 shows an example of the configuration of the scene description language.

[Scene Description]

Scene description uses BIFS. Note that a scene graph and node as concepts common to VRML and BIFS will be mainly explained below.

A node designates grouping of lower nodes which have attributes such as a light source, shape, material, color, coordinates, and the like, and require coordinate transformation. By adopting the object-oriented concept, the location of each object in a three-dimensional space and the way its looks in that space are determined by tracing a tree called a scene graph from the top node and acquiring attributes of upper nodes. By synchronously assigning media objects, e.g., a MPEG4 video bitstream, to nodes as leaves of the tree, a moving image or picture can be synthesized and displayed in a three-dimensional space together with other graphics data.

Differences from VRML are as follows. The MPEG4 system supports the following items in BIFS:

(1) two-dimensional overlap relationship description of MPEG4 video VOP coding, and synthesis description of MPEG4 audio;

(2) sync process of continuous media stream;

(3) dynamic behavior expression (e.g., sprite) of an object;

(4) standardization of the transmission format (binary); and (5) dynamic change of scene description in session.

Almost all VRML nodes except for Extrusion, Script, Proto, and ExtemProto are supported by BIFS. New MPEG4 special nodes added in BIFS are:

(1) node for 2D/3D synthesis (2) node for 2D graphics and text (3) animation node (4) audio node Note that VRML does not support 2D synthesis except for a special node such as a background, but BIFS expands description to allow text/graphics overlay and MPEG4 video VOP coding in units of pixels.

In the animation node, a special node for an MPEG4 CG image such as a face composed of 3D meshes is specified. A message (BIFS Update) that allows transposition, deletion, addition, and attribute change of nodes in the scene graph is prepared, so that a new moving image can be displayed or a button can be added on the screen during a session. BIFS can be implemented by replacing reserved words, node identifiers, and attribute values of VRML by binary data in nearly one to one correspondence.

[MPEG4 Audio]

FIG. 13 shows the types of MPEG4 audio coding schemes. Audio and sound coding schemes include parametric coding, CELP (Code Excited Linear Prediction) coding, and time/frequency conversion coding. Furthermore, an SNHC (Synthetic Natural Hybrid Coding) audio function is adopted, which includes SA (Structured Audio) coding and TTS (Text to Speech) coding. SA is a structural description language of synthetic music tones including MIDI (Music Instrument Digital data Interface), and TTS is a protocol that sends intonation, phoneme information, and the like to an external text-to-speech synthesis apparatus.

Figure 14:
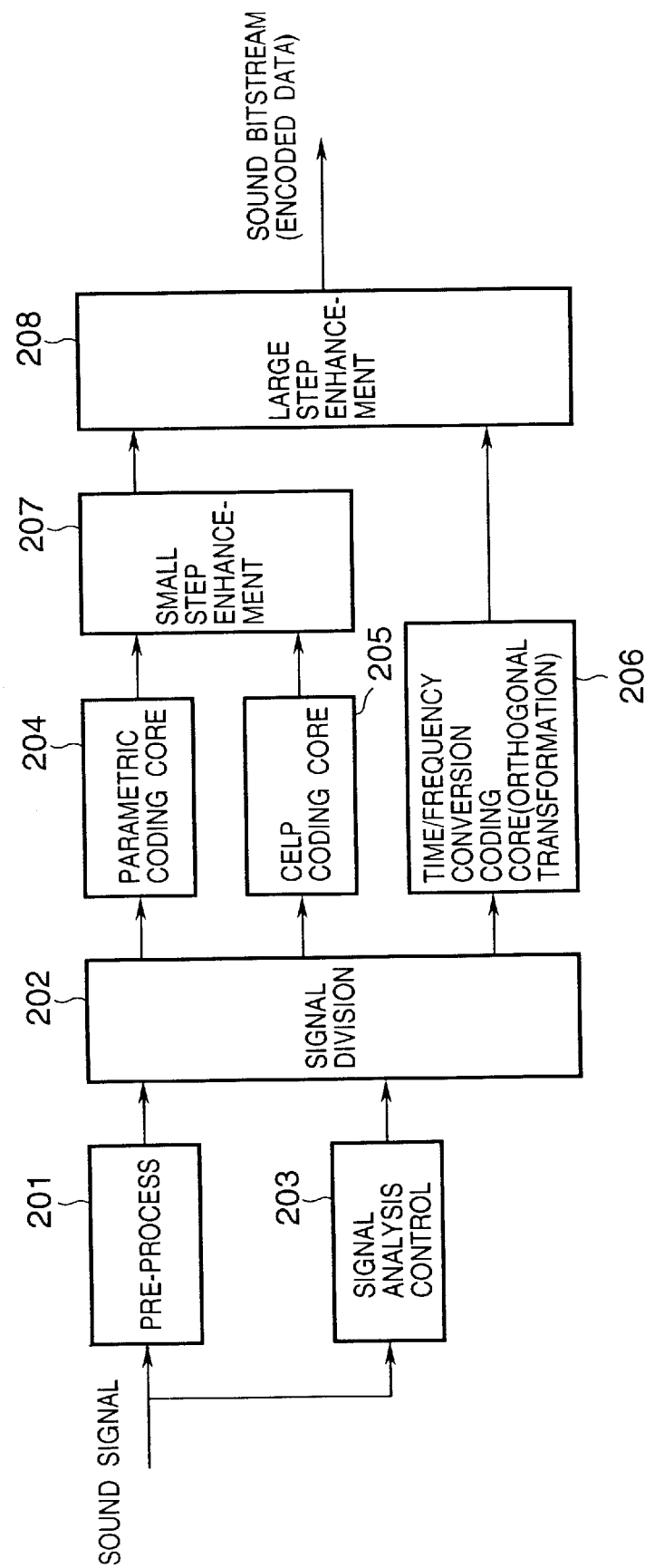
FIG. 14 is a diagram showing the arrangement of an audio coding scheme.

FIG. 14 shows the arrangement of an audio coding system. Referring to FIG. 14, an input sound signal is pre-processed (201), and is divided (202) in accordance with the frequency band so as to selectively use three different coding schemes, i.e., parametric coding (204), CELP coding (205), and time/frequency conversion coding (206). The divided signal components are input to suitable encoders. Signal analysis control (203) analyzes the input audio signal to generate control information and the like for assigning the input audio signal to the individual encoders.

Subsequently, a parametric coding core (204), CELP coding core (205), and time/frequency conversion coding core (206) as independent encoders execute encoding processes based on their own coding schemes. These three different coding schemes will be explained later. Parametricand CELP-coded audio data undergo small-step enhancement (207), and time/frequency conversion-coded and small-step-enhanced audio data undergo large-step enhancement (208). Note that small-step enhancement (207) and large-step enhancement (208) are tools for reducing distortion produced in the respective encoding processes. The large-step-enhanced audio data becomes an encoded sound bitstream.

The arrangement of the sound coding system shown in FIG. 14 has been explained. The respective coding schemes will be explained below with reference to FIG. 13.

Parametric Coding

Parametric coding expresses a sound signal including an audio signal and music tone signal, by parameters such as frequency, amplitude, pitch, and the like, and encodes these parameters. Parametric coding includes HVXC (Harmonic Vector Excitation Coding) for an audio signal, and IL (Individual Line) coding for a music tone signal.

HVXC coding mainly aims at audio coding ranging from 2 kbps to 4 kbps, classifies an audio signal into voiced and unvoiced tones, and encodes voiced tones by vector-quantizing the harmonic structure of a residual signal of an LPC (Linear Prediction Coefficient). Also, HVXC coding directly encodes unvoiced tones by vector excitation coding of a prediction residual.

IL coding aims at coding of music tones ranging from 6 kbps to 16 kbps, and encodes a signal by modeling a signal by a line spectrum.

CELP coding

CELP coding is a scheme for encoding an input sound signal by separating it into spectrum envelope information and sound source information (prediction error). The spectrum envelope information is expressed by an LPC calculated from an input sound signal by linear prediction analysis. MPEG4 CELP coding includes narrowband (NB) CELP having a bandwidth of 4 kHz, and wideband (WB) CELP having a bandwidth of 8 kHz. NB CELP can select a bit rate from 3.85 to 12.2 kbps, and WB CELP can select a bit rate from 13.7 to 24 kbps.

Time/Frequency Conversion Coding

Time/frequency conversion coding is a coding scheme that aims at high sound quality. This coding includes a scheme complying with AAC (Advanced Audio Coding), and TwinVQ (Transform-domain Weighted Interleave Vector Quantization). This time/frequency conversion coding contains a psychoacoustic model, and makes adaptive quantization exploiting an auditory masking effect.

The scheme complying with AAC frequency-converts an audio signal by, e.g., the DCT, and adaptively quantizes the converted signal exploiting an auditory masking effect. The adaptive bit rate ranges from 24 kbps to 64 kbps.

The TwinVQ scheme smoothes an MDCT coefficient of an audio signal using a spectrum envelope obtained by linear prediction analysis of an audio signal. After the smoothed signal is interleaved, it is vector-quantized using two code lengths. The adaptive bit rate ranges from 6 kbps to 40 kbps.

[System Structure]

Figure 15:
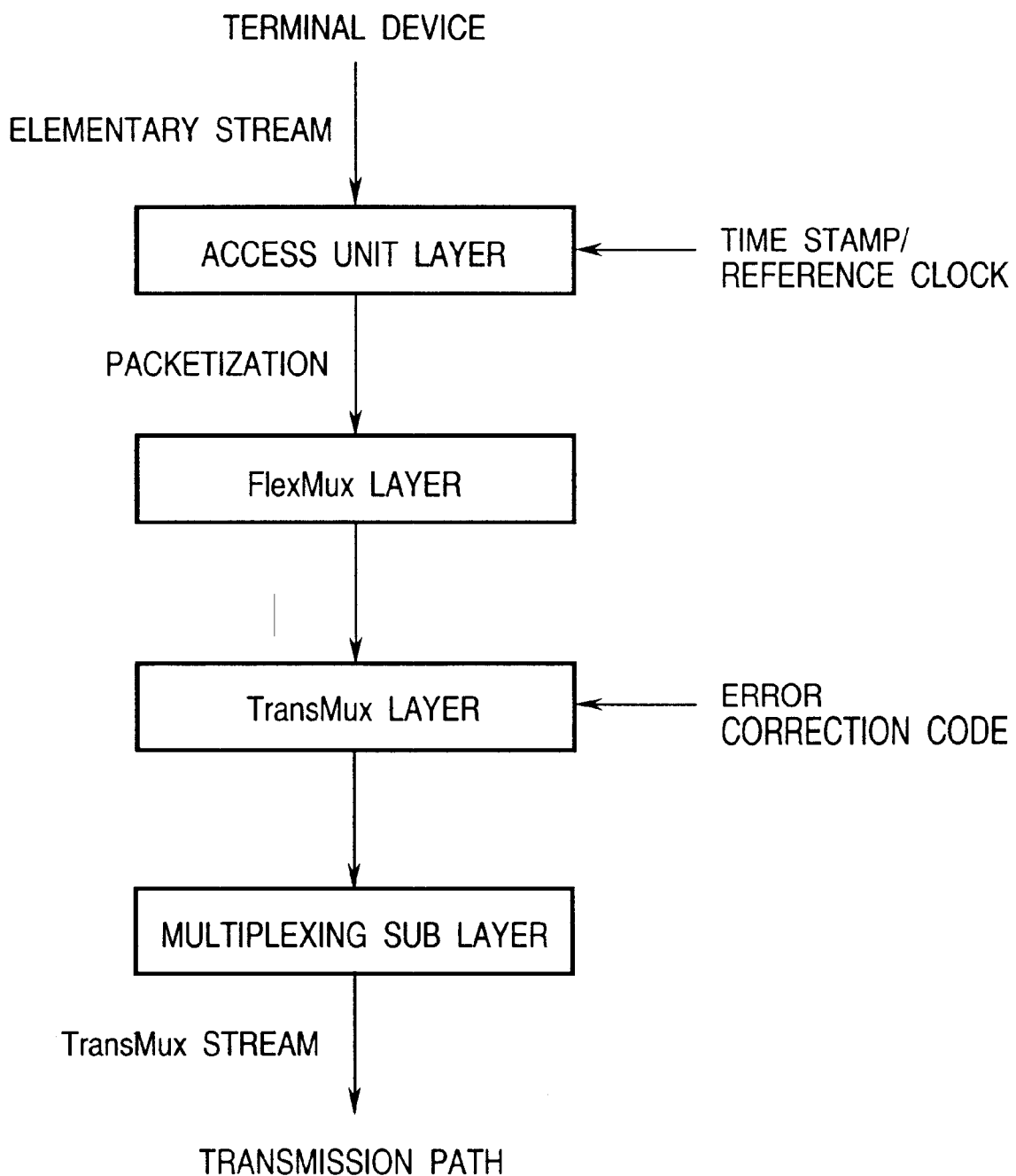
FIG. 15 is a view for explaining the MPEG4 system structure.

The system part in MPEG4 defines multiplexing, demultiplexing, and synthesis. The system structure will be explained below with reference to FIG. 15.

In multiplexing each elementary stream including individual objects as outputs from video and audio encoders, scene configuration information that describes the spatial layout of the individual objects, and the like is packetized by an access unit layer. The access unit layer appends, as a header, a time stamp, reference clock, and the like for establishing synchronization for each access unit. Obtained packetized streams are multiplexed by a FlexMux layer in a unit that considers a display unit and error robustness, and is sent to a TransMux layer.

The TransMux layer appends an error correction code in a protection sub layer in correspondence with the necessity of error robustness. Finally, a multiplex sub layer (Mux Sub Layer) outputs a single TransMux stream onto a transmission path. The TransMux layer is not defined in MPEG4, and can use existing network protocols such as UDP/IP (User Datagram Protocol/Internet Protocol) as an Internet protocol, MPEG2 transport stream (TS), ATM (Asynchronous Transfer Mode) AAL2 (ATM Adaptation layer 2), videophone multiplexing scheme (ITU-T recommendation H.223) using a telephone line, digital audio broadcast, and the like.

In order to reduce the overhead of the system layer, and to allow easy embedding in a conventional transport stream, the access unit layer or FlexMux layer may be bypassed.

On the decode side, in order to synchronize individual objects, a buffer (DB: Decoding Buffer) is inserted after demultiplexing to absorb arrival and decoding time differences of the individual objects. Before synthesis, a buffer (CB: Composition Buffer) is also inserted to adjust the display timing.

[Basic Structure of Video Stream]

Figure 16:
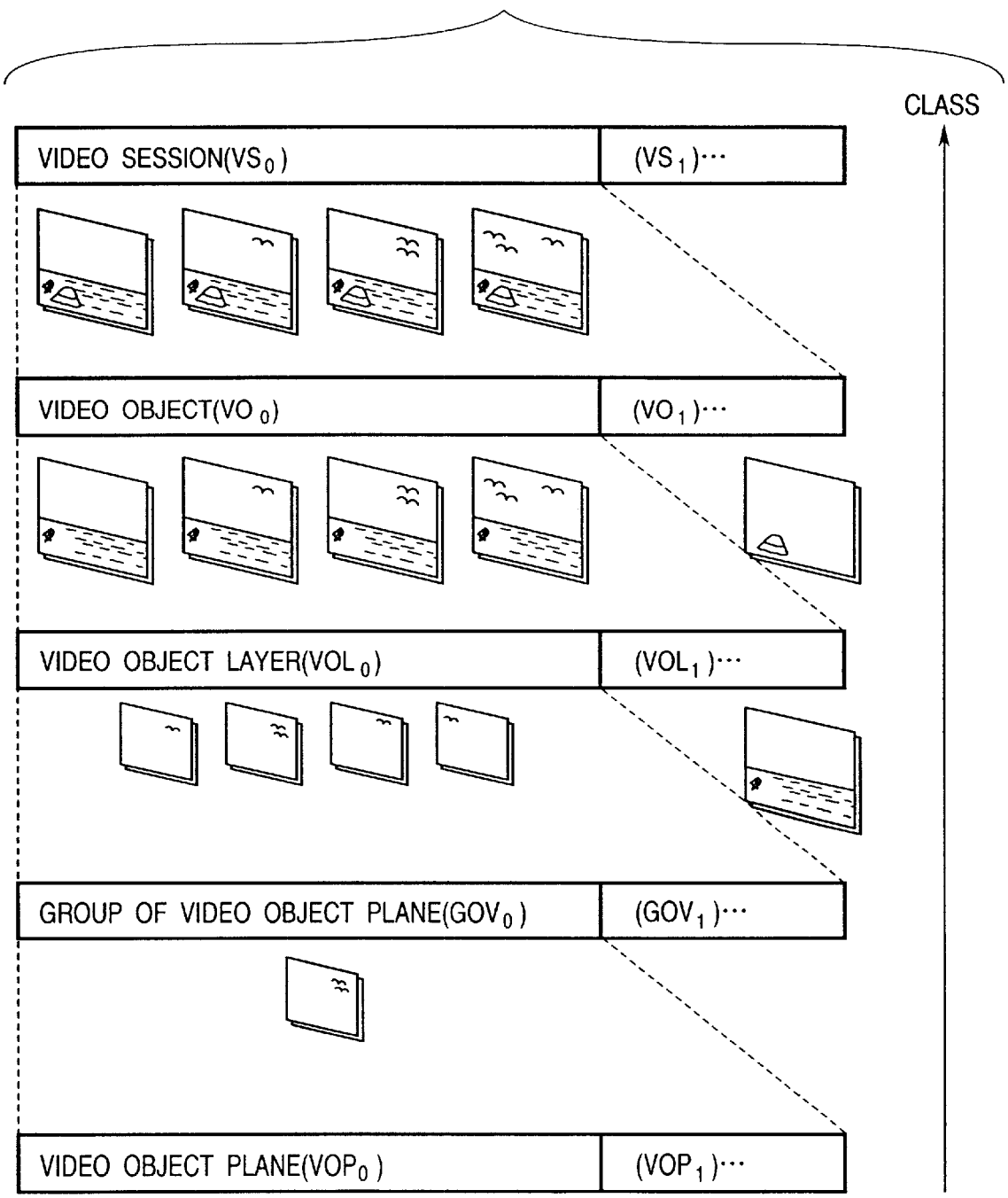
FIG. 16 is a view for explaining the MPEG4 layer structure.

FIG. 16 shows the layer structure. Respective layers are called classes, and each class has a header. The header contains various kinds of code information, such as startcode, endcode, ID, shape, size, and the like.

Video Stream

A video stream consists of a plurality of sessions. A session means one complete sequence.

A video session (VS) is formed by a plurality of video objects (VOs).

Each video object (VO) consists of a plurality of video object layers (VOLs).

Each video object layer (VOL) is a sequence including a plurality of layers in units of objects.

A group of video object plane (GOV) consists of a plurality of VOPs.

Note that a plane indicates an object in units of frames.

[Bitstream Structure Having Error Robustness]

In MPEG4, the coding scheme itself has resilience or robustness against transmission errors to achieve error-prone mobile communications (radio communications). Error correction in an existing standard scheme is mainly done on the system (sender) side. However, in a network such as PHS (Personal Handyphone System), the error rate is very high, and errors that cannot be corrected by the system may mix in a video encoded portion. In consideration of such errors, MPEG4 assumes various error patterns that cannot be corrected by the system, and adopts an error robust coding scheme that can suppress propagation of errors as much as possible in such environment. An example of error robustness that pertains to image coding, and a bitstream structure therefor will be explained below.

Reversible VLC (RVLC) and Reversible Decoding

As shown in FIG. 17, when an error is detected during decoding, the decoding process is paused there, and the next sync signal is detected. When the next sync signal has been detected, the bitstream is decoded in an opposite direction from the detection position of the sync signal. The number of decoding start points is increased without any new additional information, and the decodable information size upon production of errors can be increased compared to the conventional system. Such variable-length coding that can decode from both the forward and reverse directions implements "reversible decoding".

Multiple Transmission of Important Information

Figure 18:
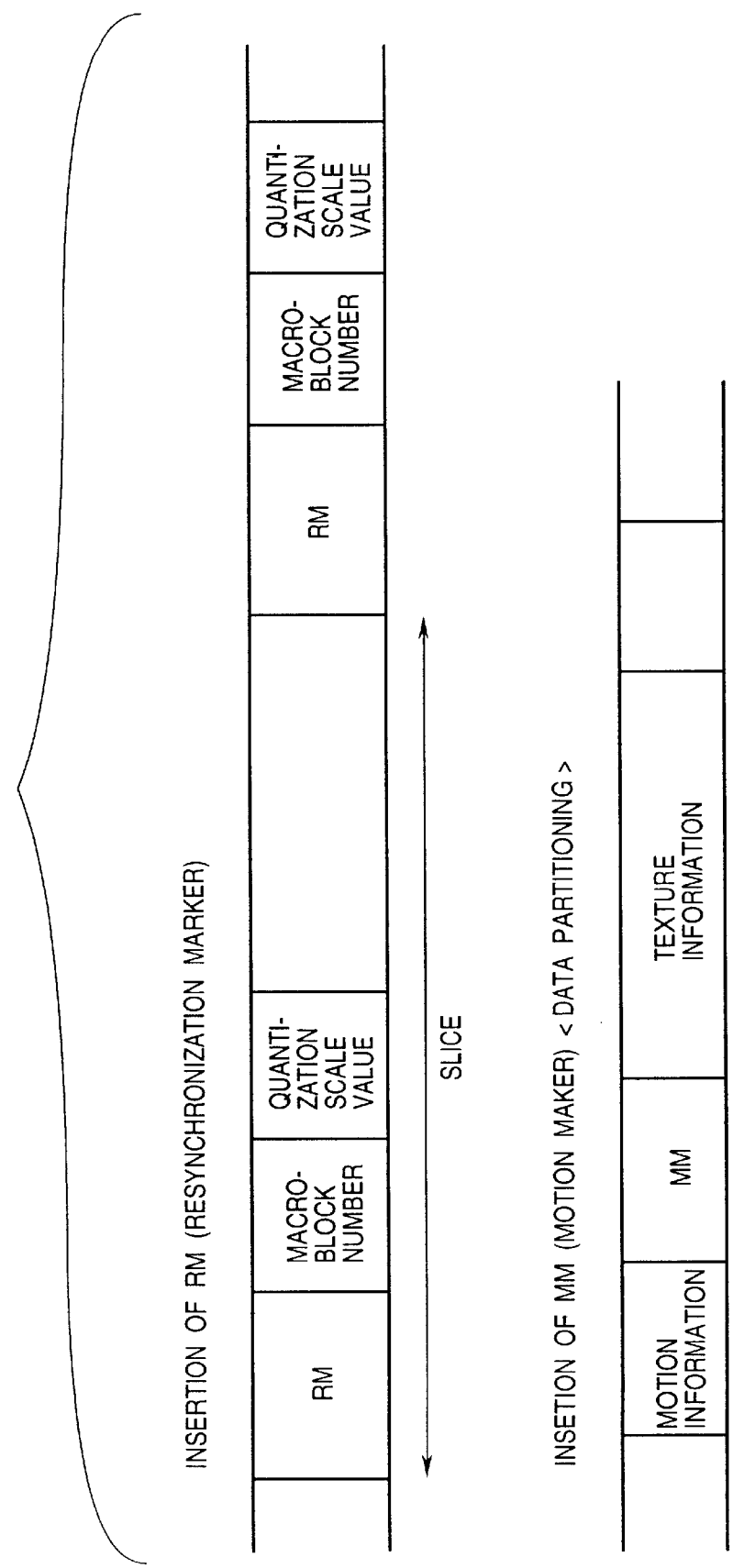
FIG. 18 is a view for explaining multiple transmissions of important information.

As shown in FIG. 18, a structure that can transmit important information a plurality of times is introduced to reinforce error robustness. For example, in order to display individual VOPs at correct timings, time stamps are required, and such information is contained in the first video packet. Even if this video packet is lost by errors, decoding can be restarted from the next video packet by the aforementioned reversible decoding structure. However, since this video packet contains no time stamp, the display timing cannot be detected after all. For this reason, a structure in which a flag called HEC (Header Extension Code) is set in each video packet, and important information such as a time stamp and the like can be appended after that flag is introduced. After the HEC flag, the time stamp and VOP coding mode type can be appended.

If synchronization has an error, decoding is started from the next resynchronization marker (RM). In each video packet, information required for that process, i.e., the number of the first MB contained in that packet and the quantization step size for that MB, are set immediately after RM. The HEC flag is inserted after such information; when HEC='1', TR and VCT are appended immediately thereafter. With such HEC information, even when the first video packet cannot be decoded and is discarded, video packets starting from one set with HEC='1" can be normally decoded and displayed. Whether or not HEC is set at '1' can be freely set on the encoder side.

Data Partitioning

Since the encoder side forms a bitstream by repeating encoding processes in units of MBs, if an error has corrupted a portion of the stream, MB data after the error cannot be decoded. On the other hand, a plurality of pieces of MB information are classified into some groups, these groups are set in a bitstream, and marker information is inserted at the boundaries of groups. With this format, even when an error mixes in the bitstream and data after that error cannot be decoded, synchronization is established again using the marker inserted at the end of the group, and data in the next group can be normally decoded.

Based on the aforementioned concept, data partitioning that classifies motion vectors and texture information (DCT coefficients and the like) in units of video packets is adopted. A motion marker (MM) is set at the boundaries of groups.

Even when an error mixes in the middle of motion vector information, the DCT coefficient after MM can be normally decoded. Hence, MB data corresponding to a motion vector before mixing of the error can be accurately reconstructed as well as the DCT coefficient. Even when an error mixes in texture information, an image which is accurate to some extent can be reconstructed by interpolation (concealment) using motion vector information and decoded previous frame information as long as the motion vector is normally decoded.

Variable-length Interval Synchronization Scheme

A resynchronization scheme for variable-length packets will be explained below. An MB group containing a sync signal at the head of the group is called a "video packet", and the number of MBs contained in that packet can be freely set on the encoder side. When an error mixes in a bitstream that uses VLCs (Variable Length Codes), the subsequent codes cannot be synchronized and cannot be decoded. Even in such case, by detecting the next resynchronization marker, the following information can be normally decoded.

[Byte Alignment]

In order to attain matching with the system, information is multiplexed in units of integer multiples of bytes. A bitstream has a byte alignment structure. In order to achieve byte alignment, stuffing bits are inserted at the end of each video packet. The stuffing bits are also used as an error check code in a video packet.

The stuffing bits consist of a code like '01111', i.e., the first bit='0' and other bits='1'. More specifically, if MBs in a given video packets are normally decoded up to the last MB, a code that appears after that MB is always '0', and a run of '1's having a length 1 bit shorter than that of the stuffing bits should appear after '0'. If a pattern that violates this rule is detected, this means that decoding before that pattern is not normal, and an error in a bitstream can be detected.

The MPEG4 technology has been explained with reference to "Outline of MPEG4 International Standards Determined", *Nikkei Electronics*, 1997.9.22 issue, p. 147–168, "Full Story of Upcoming MPEG4", The Institute of Image Information and Television Engineers Text, Oct. 2, 1997, "Latest Standardization Trend of MPEG4 and Image Compression Technique", Japan Industry Engineering Center Seminar Reference, Feb. 3, 1997, and the like.

First Embodiment

[Arrangement]

Figure 19:
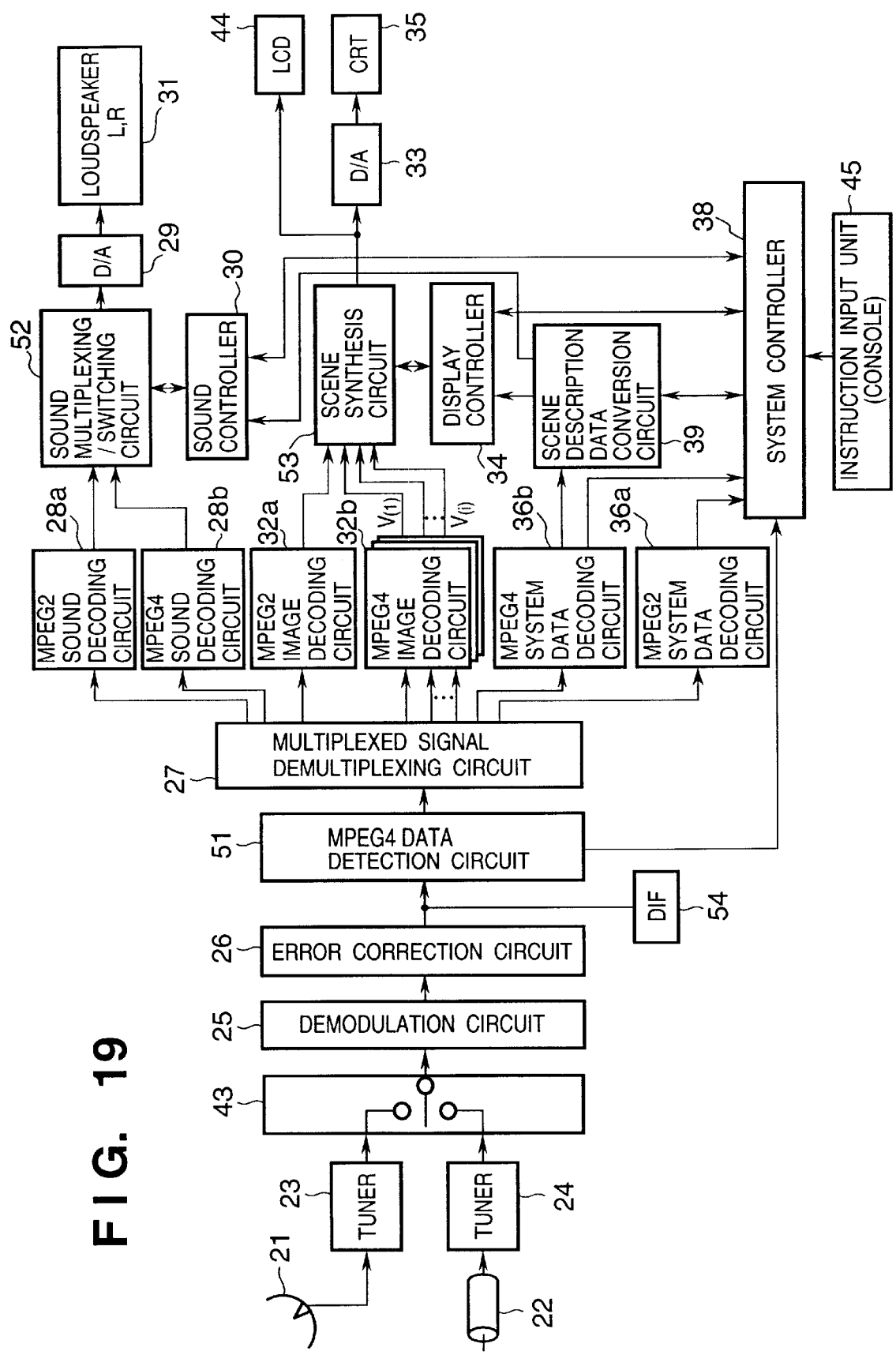
FIG. 19 is a block diagram showing the arrangement of a TV broadcast receiving apparatus according to the first embodiment of the present invention.

A TV broadcast receiving apparatus according to the first embodiment of the present invention will be described below with reference to the accompanying drawings. FIG. 19 is a block diagram showing the arrangement of a TV broadcast receiving apparatus of the first embodiment.

A digital TV broadcast signal is tuned in and received depending on its broadcast pattern, e.g., by a satellite antenna 21 and tuner 23 in case of satellite broadcast or by a tuner 24 via a cable 22 in case of cable broadcast. TV information received from satellite or cable broadcast is input to a data selector 43 to select one data sequence. The selected data sequence is demodulated by a demodulation circuit 25, and the demodulated data undergoes error correction in an error correction circuit 26.

The TV broadcast receiving apparatus can record error-corrected TV information in a recording/reproduction apparatus such as a DVD recorder, VTR, or the like connected via a digital data interface (DIF) 54 that supports a digital data interface such as IEEE1394 or the like, and can receive TV information reproduced by the recording/reproduction apparatus.

An MPEG4 data detection circuit 51 detects if MPEG4 data is included in a data sequence of error-corrected TV information.

TV information in the first embodiment has a format in which an image object and/or sound object, which are/is encoded by MPEG 4 and have/has a small data size, are/is multiplexed in main image and sound data as TV information encoded by MPEG2. Hence, the MPEG4 data detection circuit 51 detects if an MPEG4 datastream as sub data is included in a predetermined field in an MPEG2 datastream that mainly forms TV information. Of course, a method of detecting an ID or the like for identification, which indicates the presence of an MPEG4 datastream appended to an MPEG2 datastream is one of detection methods. Note that a method of multiplexing an MPEG4 datastream in an MPEG2 datastream will be explained in detail later.

When the MPEG4 data detection circuit 51 detects that an MPEG4 object is multiplexed in an MPEG2 data stream, it sends a signal indicating that detection to a system controller 38. The system controller 38 controls reproduction/display of image and sound data in accordance with that signal.

On the other hand, a multiplexed data demultiplexing circuit 27 demultiplexes TV information into MPEG2 sound data, MPEG2 image data, and MPEG2 system data in correspondence with individual decoding circuits. Furthermore, when an MPEG4 datastream is included in an MPEG2 datastream, the multiplexed data demultiplexing circuit 27 demultiplexes the TV information into an MPEG4 sound object, MPEG4 image object, and MPEG4 system data including scene description information and the like in correspondence with individual decoding circuits.

The demultiplexed data or objects are respectively decoded by an MPEG2 sound decoding circuit 28a, MPEG2 image decoding circuit 32a, MPEG2 system data decoding circuit 36a, MPEG4 sound decoding circuit 28b, MPEG4 image decoding circuit 32b, and MPEG4 system data decoding circuit 36b. The MPEG2 sound decoding circuit 28a, MPEG2 image decoding circuit 32a, and MPEG2 system decoding circuit 36a construct an MPEG2 decoding circuit (MPEG2 decoder). Also, the MPEG4 sound decoding circuit 28b, MPEG4 image decoding circuit 32b, and MPEG4 system data decoding circuit 36b construct an MPEG4 decoding circuit (MPEG4 decoder). Since the decoding methods and decoding circuits of MPEG2 data are known to those who are skilled in the art, a description thereof will be omitted.

The MPEG4 decoding method and decoding circuits have already been described above, and decoding of MPEG4 image objects will be supplementarily explained below. MPEG4 image objects are decoded by the MPEG4 image decoding circuit 32b having a plurality of similar decoding units that decode in correspondence with individual image objects. The decoding scheme used in this case decodes in units of objects on the basis of the aforementioned MPEG4 image coding scheme, and decoded image data are images v(1) to v(i) corresponding to the number of objects.

The decoded sound data are input to a sound multiplexing/switching circuit 52 that multiplexes or switches the outputs from the MPEG2 sound decoding circuit 28a and MPEG4 sound decoding circuit 28b. In the sound multiplexing/switching circuit 52, multiplexing of MPEG2 and MPEG4 sound data or switching for outputting either MPEG2 or MPEG4 sound data is done, and sound data to be output undergoes various kinds of output adjustment. The sound multiplexing/switching circuit 52 is controlled by a sound controller 30.

The sound controller 30 makes output control in accordance with MPEG4 scene description information output from a scene description data conversion circuit 39, and operates in accordance with a command from the system controller 38.

The system controller 38 receives a user instruction input via an instruction input unit (console) 45, which indicates sound data to be selected or instructs to multiplex sound data if a plurality of sound data are available. The system controller 38 outputs a command according to that instruction and the detection signal from the MPEG4 data detection circuit 51, i.e., a command for multiplexing/switching sound data to the sound controller 30. Of course, if no MPEG4 sound object is available, only an MPEG2 sound object is reproduced. Final sound data output from the sound multiplexing/switching circuit 52 is converted into an analog signal by a D/A converter 29, and the analog signal is reproduced by loudspeakers 31 as stereo sound data.

Reproduction of an image will be explained below. The outputs from the MPEG2 image decoding circuit 32a and MPEG4 image decoding circuit 32b are input to a scene synthesis circuit 53. On the other hand, the system controller 38 outputs a command for scene synthesis to a display controller 34 in accordance with the detection signal from the MPEG4 data detection circuit 51 and a user instruction input via the instruction input unit (console) 45. Note that the user instruction input via the instruction input unit 45 includes an instruction for selecting an MPEG4 image object to be synthesized and displayed, and the like. The display controller 34 controls display, i.e., operation of a scene synthesis circuit 53, in accordance with MPEG4 scene description information input from the scene description data conversion circuit 39 and the command input from the system controller 38.

The scene synthesis circuit 53 synthesizes MPEG2 and MPEG4 images into a scene under the control of the display controller 34. Note that only required MPEG4 image objects may be selected, synthesized, and reproduced in place of displaying all MPEG4 image objects. Of course, if no MPEG4 image object is available, only an MPEG2 image is reproduced. The synthesized display image is converted into an analog signal by a D/A converter 33, and is displayed on a CRT 35. Alternatively, the synthesized display image may be sent to a liquid crystal flat display (LCD) 44 or the like as a digital signal, and may be displayed thereon.

The process of system data will be explained below. MPEG2 system data is decoded by the MPEG2 system data decoding circuit 36a, and is input to the system controller 38 as various commands for controlling MPEG2 image and sound data. The system controller 38 uses the MPEG2 system data as control data as needed.

On the other hand, MPEG4 system data (including scene description information) is decoded by the MPEG4 system data decoding circuit 36b, and information which is included in the decoded system data and pertains to scene description is input to the scene description data conversion circuit 39. Other system data are input to the system controller 38 as various commands that control MPEG4 image and sound data, scene description information, and the like, and are used as control data as needed. The scene description data conversion circuit 39 outputs scene description data that defines the output formats of MPEG4 image and sound data to the sound controller 30 and display controller 34 in accordance with the scene description information.

From the instruction input unit 45, various instructions are input in addition to the aforementioned user instructions that pertain to sound and image choices. The system controller 38 systematically controls the respective units of the reception/display apparatus in accordance with instruction inputs from the instruction input unit 45 or by automatic control according to its operation.

[Datastream]

A method of multiplexing an MPEG4 datastream in an MPEG2 datastream as TV information will be explained below using FIGS. 20 and 21.

Figure 20:
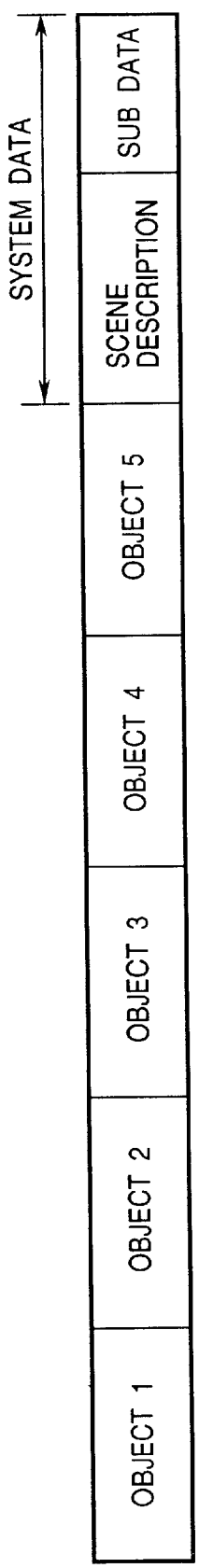
FIGS. 20 and 21 are views for explaining a method of multiplexing an MPEG4 datastream on an MPEG2 datastream.

FIG. 20 shows the MPEG4 datastream format. As shown in FIG. 20, in the MPEG4 datastream, a photo image object, a sound object including audio data, a synthetic image object such as computer graphics (CG) or the like, and so on are stored in a database of objects 1 to 5. Furthermore, as MPEG4 system data, scene description information (BIFS) for display output control, and various other required data (sub data) are stored.

Figure 21:
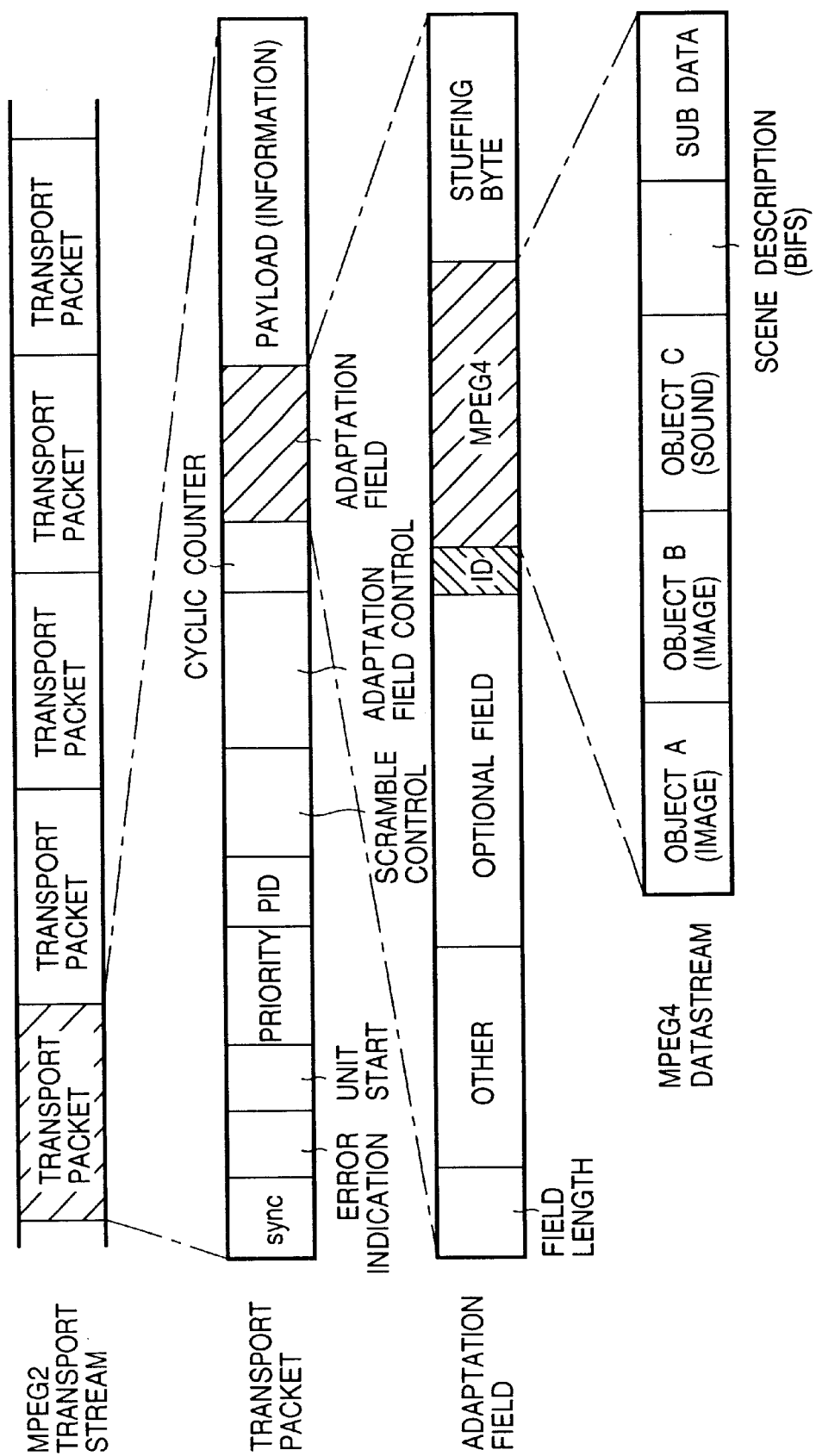

FIG. 21 shows the MPEG2 transport stream structure, i.e., the transmission format of an MPEG2 datastream. A method of multiplexing an MPEG4 datastream in an MPEG2 datastream will be explained below using FIG. 21.

An MPEG2 transport stream is obtained by multiplexing into transport packets each having a fixed length. The data structure of each transport packet is hierarchically expressed, as shown in FIG. 21, and includes items shown in FIG. 21. These items will be explained in turn: an 8-bit "sync signal (sync)", an "error indicator" indicating the presence/absence of any bit error in a packet, "unit start" indicating that a new unit starts from the payload of this packet, "priority (packet priority)" indicating the importance level of this packet, "identification information PID (packet Identification)" indicating an attribute of an individual stream, "scramble control" indicating the presence/absence and type of scramble, "adaptation field control" indicating the presence/absence of an adaptation field and the presence/absence of a payload in this packet, a "cyclic counter" as information for detecting whether some packets having identical PID are discarded during transmission, an "adaptation field" that can store additional information or stuffing byte as an option, and a payload (image or sound information). The adaptation field consists of a field length, various items pertaining to other individual streams, an optional field, and stuffing byte (invalid data byte).

In the first embodiment, an MPEG4 datastream as sub image or sound data of TV information and an ID for identifying that stream are considered as ones of additional data in the optional field, and are multiplexed in the optional field.

That is, main TV information is an MPEG2 datastream (transport stream). As shown in FIG. 21, an MPEG4 datastream is formed by combining image objects (objects A and B) such as a photo image, CG, character, and the like having a small data size, a sound object (object C), scene description information (BIFS), and other necessary data (sub data). By multiplexing this MPEG4 datastream as a part of the optional field in the MPEG2 system data, transmission of MPEG2 /MPEG4 multiplexed datastream can be implemented.

[Reproduction/Display Examples]

Reproduction/display examples of the reception/display apparatus of the first embodiment will be explained below with reference to FIGS. 22 to 26. Note that FIGS. 22 to 26 exemplify a baseball live program broadcasted by MPEG2.

Figure 22:
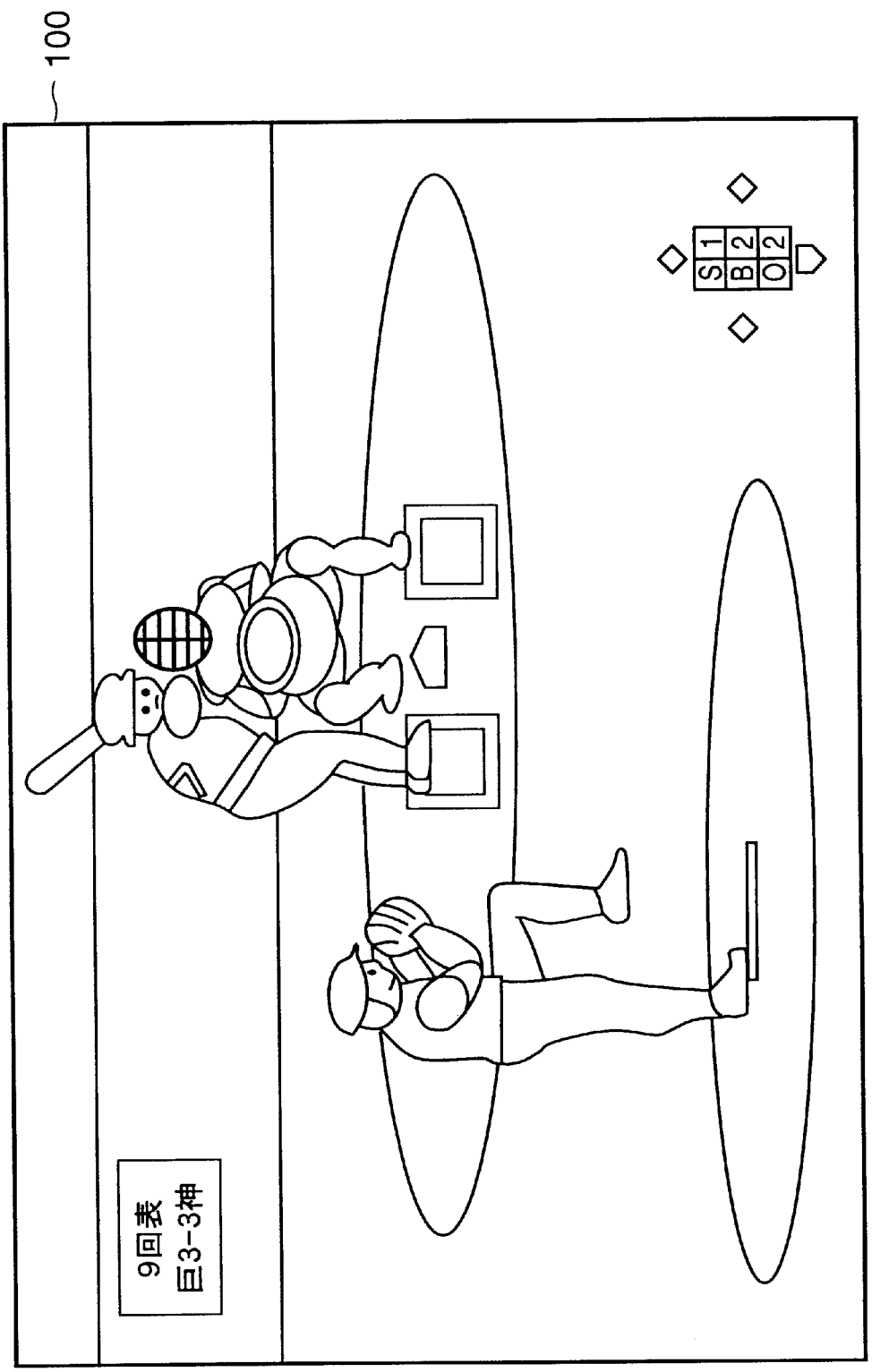
FIGS. 22 to 26 are views for explaining reproduced display examples.
Figure 23:
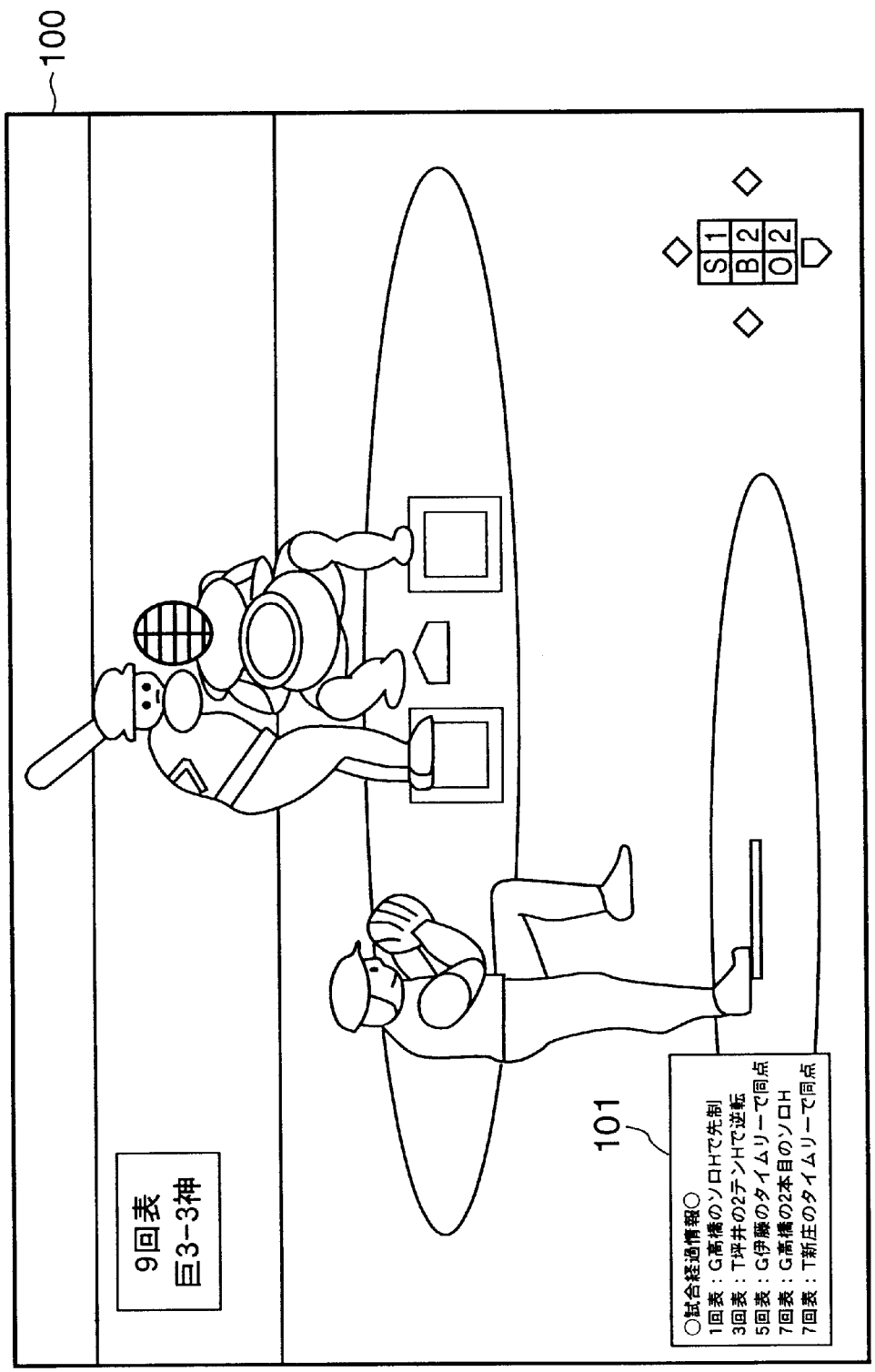
Figure 24:
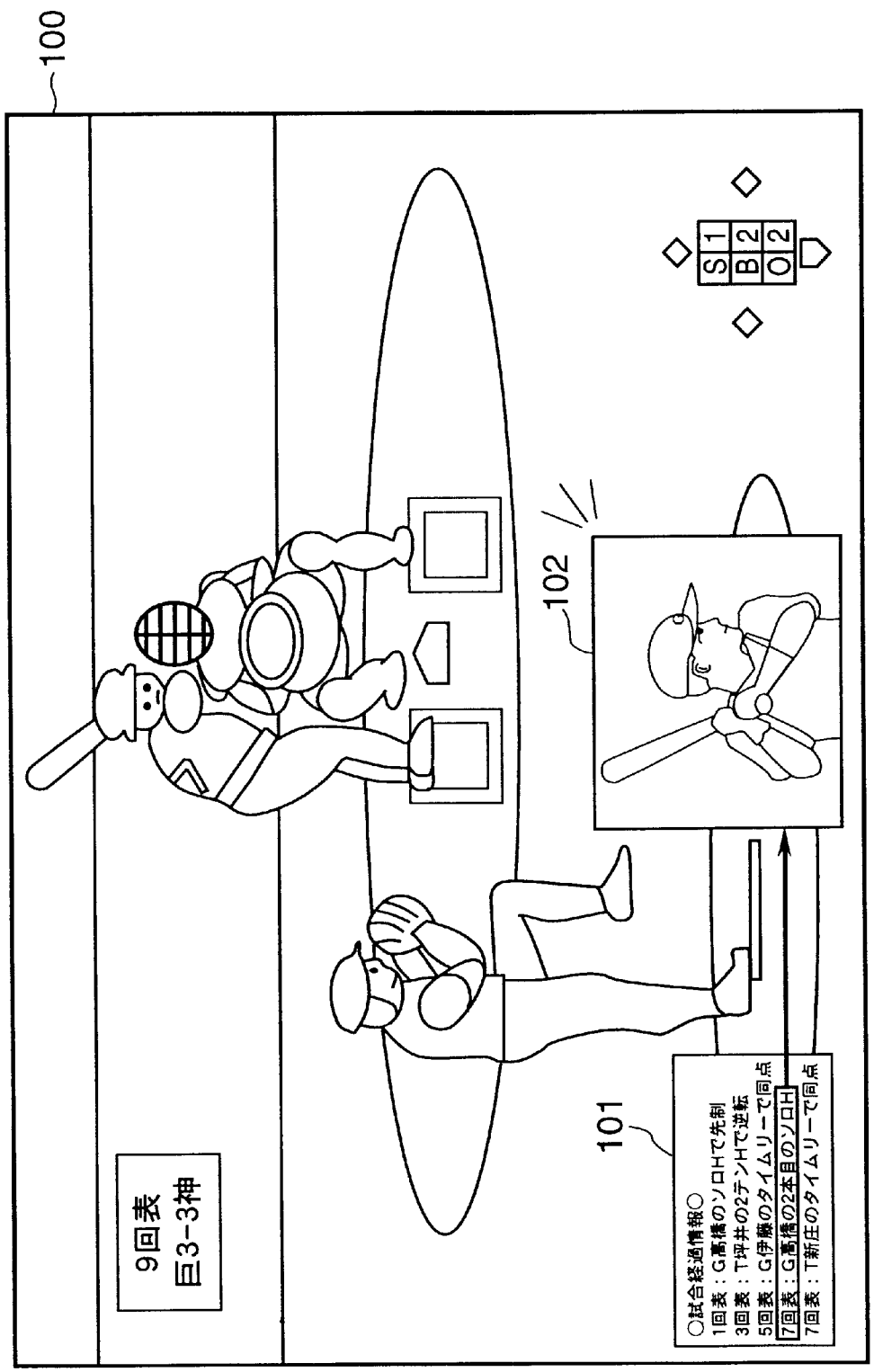
Figure 25:
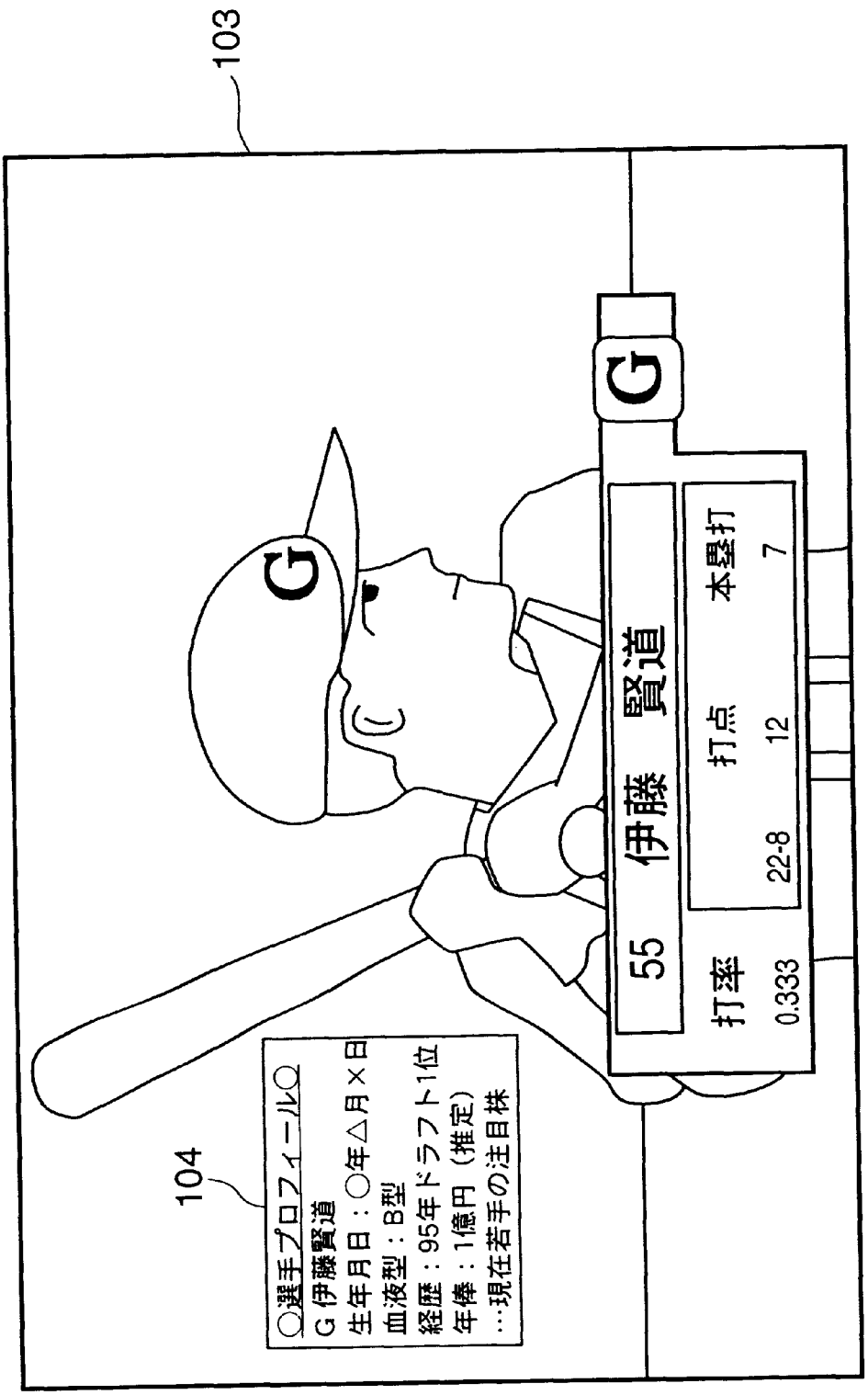
Figure 26:
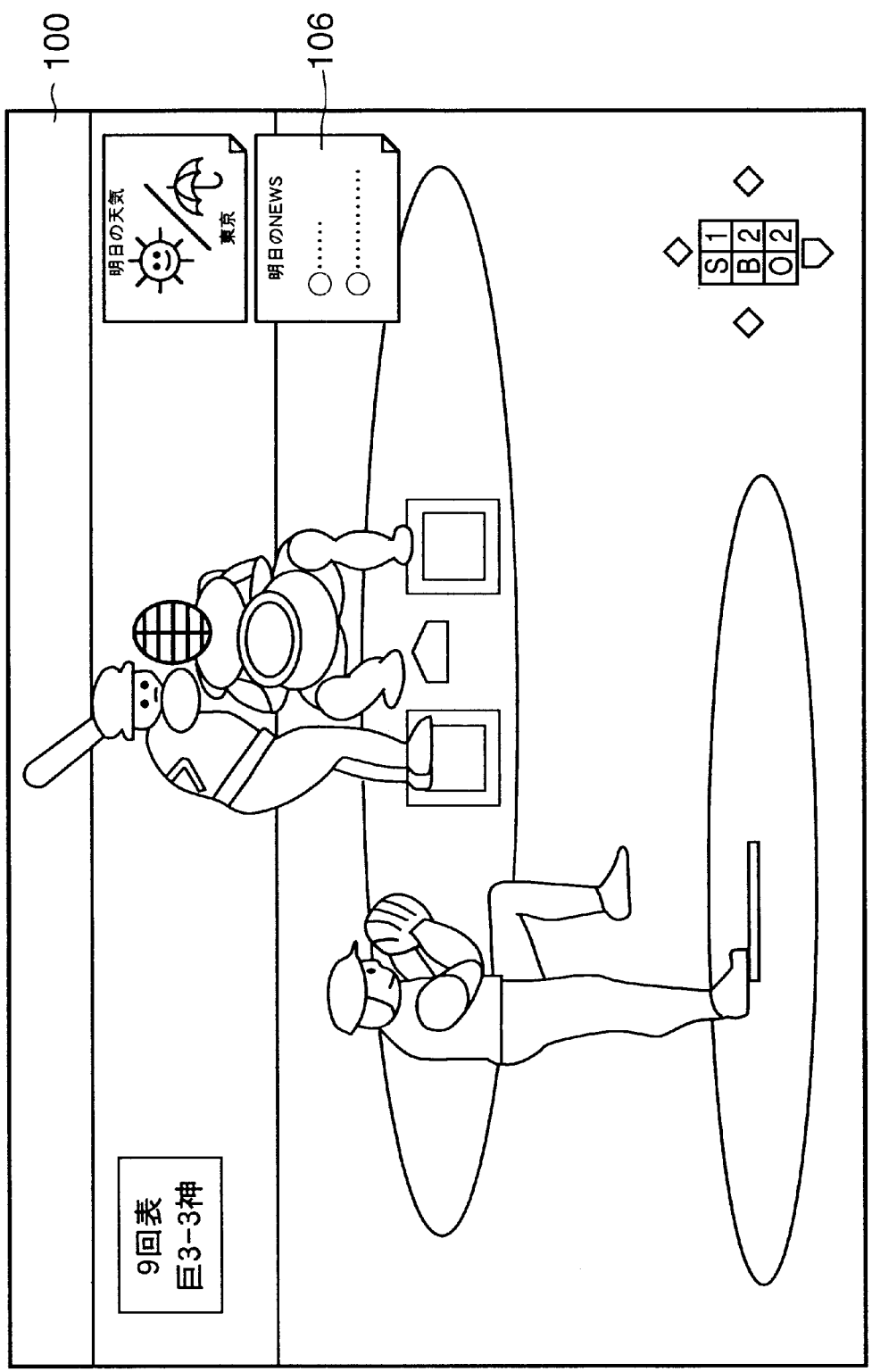

FIG. 22 shows an example of a scene in which only an MPEG2 broadcast image as a basic video 100 is displayed. FIG. 23 shows an example in which game summary information 101 as an MPEG4 image object is scene-synthesized with the basic video 100. FIG. 24 shows an example in which a playback video 102 as an MPEG4 image object is scene-synthesized in addition to the game summary information 101, and a playback video sound as an MPEG4 sound object is multiplexed. FIG. 25 shows an example wherein player information 104 as an MPEG4 image object is scene-synthesized with a basic image 103. FIG. 26 shows an example in which a weather forecast 105 and news 106 as MPEG4 image objects are scene-synthesized with the basic video 100.

In this manner, according to the first embodiment, MPEG4 objets can be multiplexed (including scene synthesis) on every MPEG2 video (image), and the multiplexed video (image) or sound can be displayed or reproduced (output).

Even when an MPEG4 object to be multiplexed is an image object, it is not limited to a still image, and a real-time moving image and sound data appended thereto can be handled. Also, such MPEG4 objects can be used as sub sound data for a person suffering eyesight-related problems.

Furthermore, as shown in FIGS. 22 to 26, detailed information that pertains to the contents of a main image (video) as an MPEG2 image object can be provided as an MPEG4 image object, and a previous scene that the user may desire can be provided as needed. Also, daily life information such as weather forecast, traffic information, news, and the like which are not associated with the main image (video) can be provided as MPEG4 image objects, and applications to various purposes can be expected.

[Operation Sequence]

Figure 27:
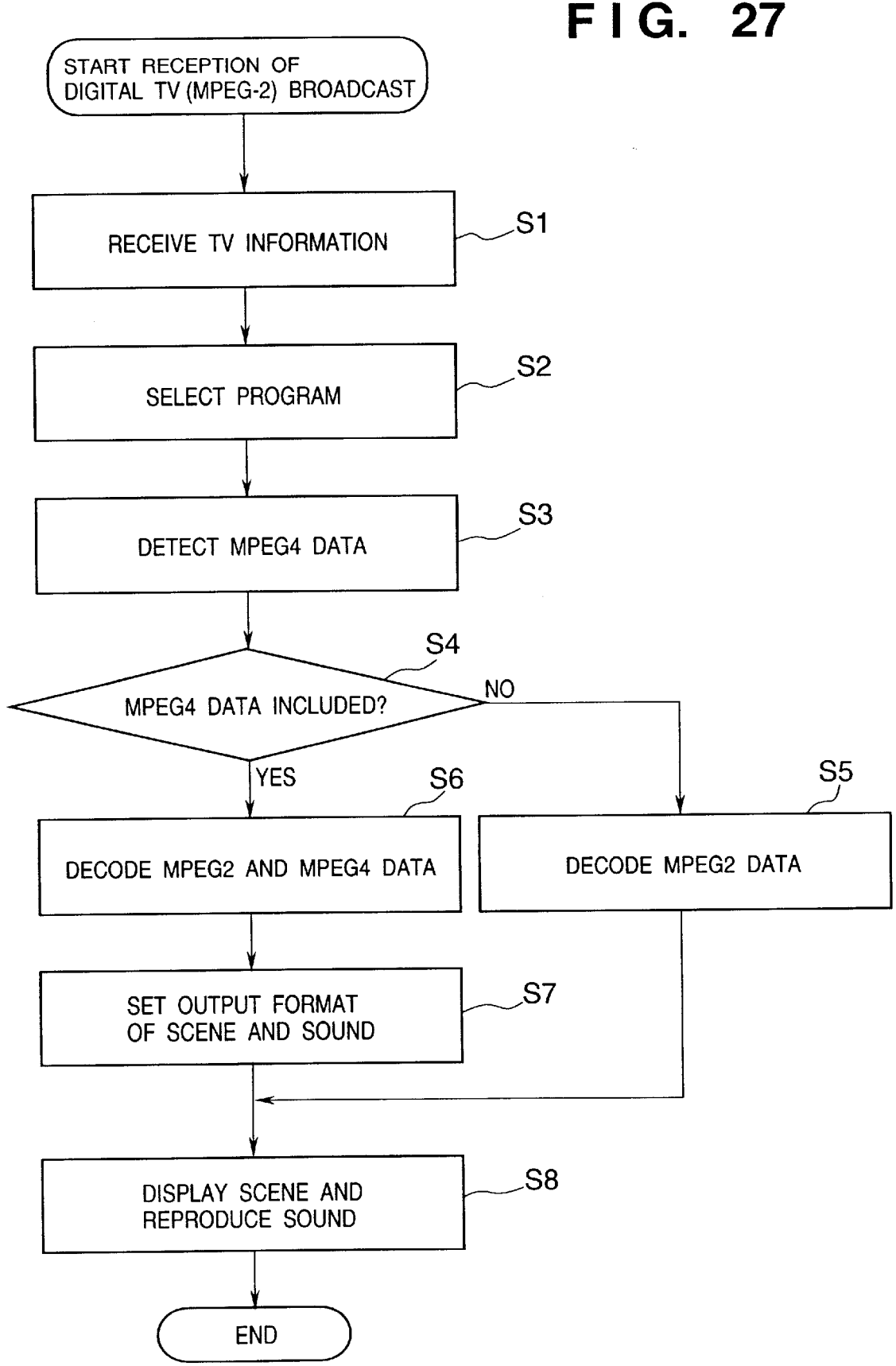
FIG. 27 is a flow chart for explaining the operation sequence of a digital TV reception/display apparatus.

FIG. 27 is a flow chart for explaining the operation sequence of the digital TV reception/display apparatus of the first embodiment.

MPEG2 digital TV information is received from a broadcast satellite or via a cable (step S1), and a program is selected from the received digital TV information using a tuner 23 or 24 (step S2).

The MPEG4 data detection circuit 51 then detects MPEG4 data of sub TV information multiplexed in an MPEG2 datastream of the selected program (step S3), and it is checked based on the detection result if MPEG4 data is included in the MPEG2 datastream (step S4). If no MPEG4 data is included, only the received MPEG2 is demultiplexed into sound, image, and system data, and the demultiplexed data are decoded by the aforementioned processes (step S5).

On the other hand, if MPEG4 data is included, an MPEG4 datastream is demultiplexed from the MPEG2 datastream, MPEG2 and MPEG4 data are respectively demultiplexed into sound, image, and system data, and the demultiplexed data are decoded by the aforementioned processes (step S6). Furthermore, the output formats of MPEG2 video (image) and sound data and MPEG4 scene and sound data are set by the scene synthesis circuit 53, sound multiplexing/switching circuit 52, and the like (step S7).

In this manner, the MPEG2 video (image) and sound decoded in step S5 or a scene obtained by synthesizing the MPEG2 video (image) with the MPEG4 image (video) and sound obtained by multiplexing/switching the MPEG2 and MPEG4 sound data in step S7 are displayed and reproduced (step S8).

Note that some or all the processes in steps S1 to S8 are repeated as needed.

To restate, according to the first embodiment, digital TV broadcast consisting of a datastream obtained by multiplexing MPEG4 image (video) and sound data as sub information into an MPEG2 datastream as main TV information is received, and video (image) and sound data can be reproduced. Hence, digital TV broadcast as multi-functional data transmission can be implemented, and a TV program can be displayed and reproduced in a more user friendly way.

Since MPEG4 is used to transmit sub information, compatibility with MPEG2 as the current digital TV broadcast system can be easily improved, and existing contents for MPEG2 can be effectively used.

Also, MPEG4 that can handle image (video) data and sound data including audio data is an optimal data format upon transmitting sub information.

[Other]

A case will be explained below wherein a digital TV reception/display apparatus compatible to MPEG2 alone shown in FIG. 28 has received the aforementioned digital TV broadcast in which MPEG4 data of sub TV information is multiplexed in an MPEG2 datastream of main TV information.

Figure 28:
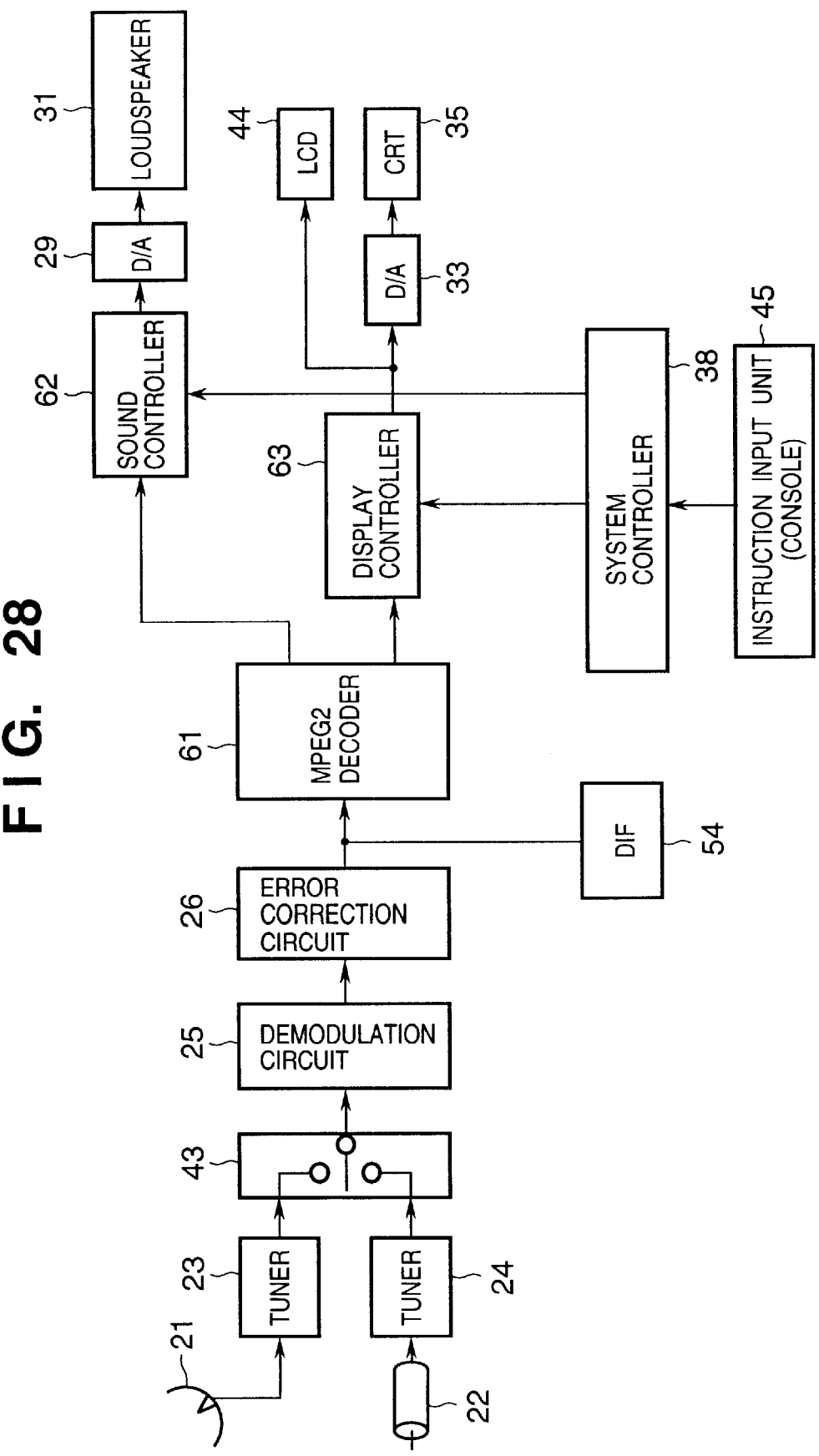
FIG. 28 is a block diagram showing the arrangement of a digital TV reception/display apparatus compatible to MPEG2 alone.

An MPEG2 decoder 61 shown in FIG. 28 decodes image, sound, and system data encoded by MPEG2. A sound controller 62 controls reproduction of the decoded MPEG2 sound data, and a display controller 63 controls reproduction/display of the decoded MPEG2 image (video) data. Since the digital TV broadcast reception/display apparatus shown in FIG. 28 has no MPEG4 decode function, it cannot decode MPEG4 data multiplexed as sub information in the MPEG2 datastream, and can only reproduce MPEG2 image (video) and sound data.

In this case, the MPEG2 datastream has the format shown in FIG. 21, and an MPEG4 datastream is contained in the optional field in the MPEG2 datastream. The MPEG2 decoder 61 of the TV broadcast reception/display apparatus shown in FIG. 28 ignores MPEG4 data in its decoding process.

With this arrangement, when the MPEG2 datastream shown in FIG. 21, i.e., digital TV broadcast multiplexed with the MPEG4 datastream is received, a reception/display apparatus having the MPEG4 decoding & reproduction function can decode and reproduce TV broadcast information of both MPEG2 and MPEG4. On the other hand, a reception/display apparatus having no MPEG4 decoding & reproduction function can decode and reproduce only MPEG2 TV broadcast information as a basic MPEG2 datastream.

In this manner, the aforementioned data transmission scheme of digital TV broadcast in which MPEG4 data of sub TV information is multiplexed in an MPEG2 datastream of main TV information can cope with a reception/display apparatus which is compatible to MPEG2 alone. Hence, the aforementioned data transmission scheme of digital TV broadcast can be broadcasted irrespective of functions of reception/display apparatuses (TV receivers), and can be introduced even during transient period to MPEG4 compatible reception/display apparatuses.

Second Embodiment

A video/sound reproduction/display apparatus according to the second embodiment of the present invention will be described below. Note that the same reference numerals in the second embodiment denote the same parts as those in the first embodiment, and a detailed description thereof will be omitted.

The second embodiment will explain that multiplexing of MPEG2 and MPEG4 data mentioned above can be applied to package media such as a DVD and the like that handle data encoded by MPEG2.

Figure 29:
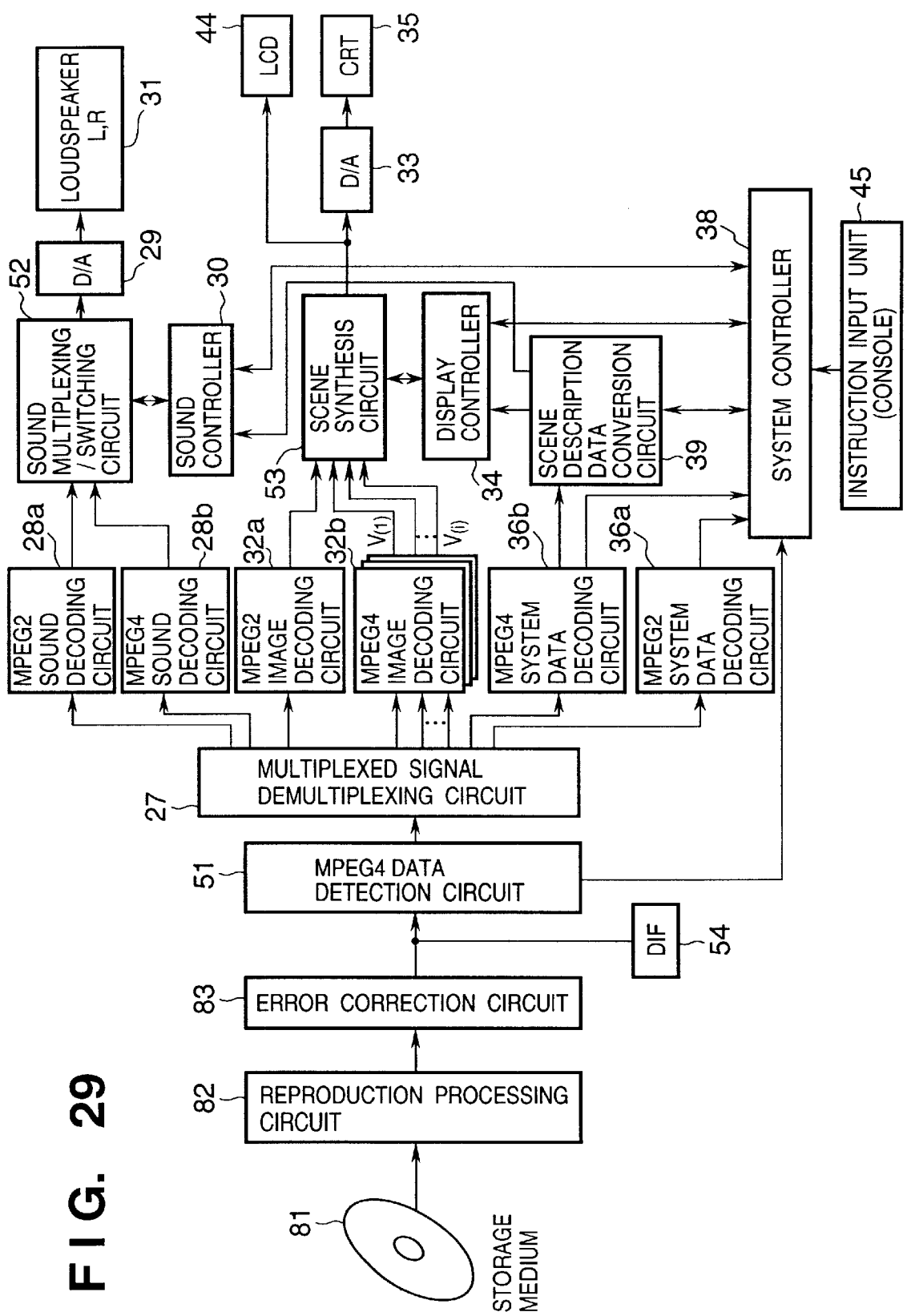
FIG. 29 is a block diagram showing the arrangement of a package medial reproduction/display apparatus according to the second embodiment of the present invention.

FIG. 29 is a block diagram showing the arrangement of a reproduction/display apparatus of package media such as a DVD and the like that handle data encoded by MPEG2.

A storage medium 81 is a recording medium that holds digital video data. Digital video data is recorded on the storage medium 81 in a data format in which sub video information encoded by MPEG4 is multiplexed in main video information encoded by MPEG2. The MPEG2 and MPEG4 data are multiplexed by the multiplexing method explained above using FIG. 21.

Referring to FIG. 29, digital video data recorded on the storage medium 81 is reproduced by a reproduction processing circuit 82, and undergoes error correction by an error correction circuit 83. The error corrected digital video data is then sent to the MPEG4 data detection circuit 51. After that, image, sound, and system data are coded in the same procedure as that described using FIG. 19, thus displaying and reproducing video (image) and sound data.

Figure 30:
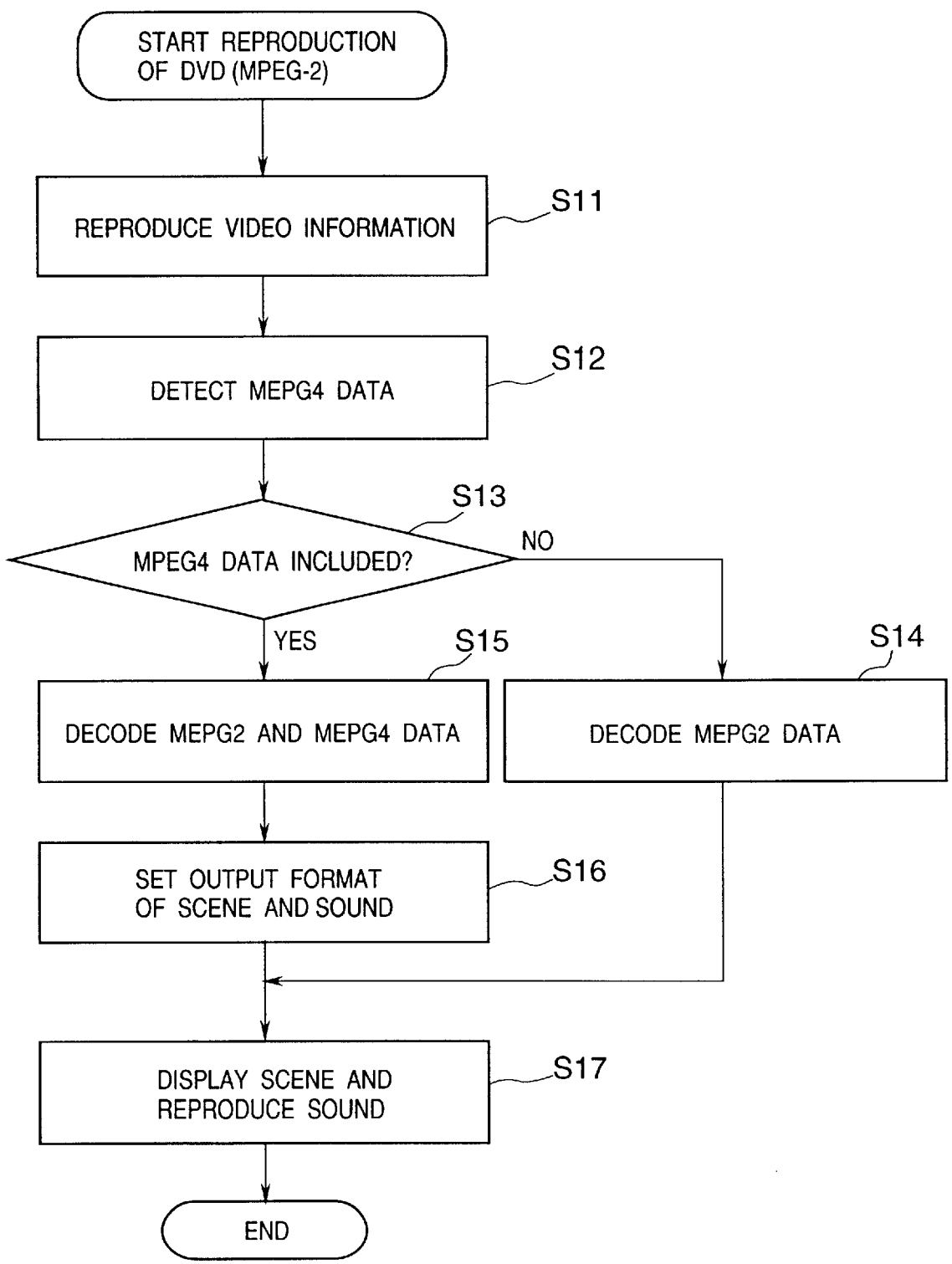
FIG. 30 is a flow chart for explaining the operation sequence of the reproduction/display apparatus.

FIG. 30 is a flow chart for explaining the operation sequence of the reproduction/display apparatus of the second embodiment.

MPEG2 digital TV information is reproduced from the storage medium 81 (step S11). The MPEG4 data detection circuit 51 detects MPEG4 data of sub video information multiplexed in an MPEG2 datastream of the reproduced video information (step S12), and it is checked based on the detection result if MPEG4 data is included in the MPEG2 datastream (step S13). If no MPEG4 data is included, only the reproduced MPEG2 data is demultiplexed into sound, image, and system data, and the demultiplexed data are decoded by the aforementioned processes (step S14).

On the other hand, if MPEG4 data is included, an MPEG4 datastream is demultiplexed from the MPEG2 datastream, MPEG2 and MPEG4 data are respectively demultiplexed into sound, image, and system data, and the demultiplexed data are decoded by the aforementioned processes (step S15). Furthermore, the output formats of MPEG2 video (image) and sound data and MPEG4 scene and sound data are set by the scene synthesis circuit 53, sound multiplexing/switching circuit 52, and the like (step S16).

In this manner, the MPEG2 video (image) and sound decoded in step S14 or a scene obtained by synthesizing the MPEG2 video (image) with the MPEG4 image (video) and sound obtained by multiplexing/switching the MPEG2 and MPEG4 sound data in step S16 are displayed and reproduced (step S17).

Note that some or all the processes in steps S11 to S17 are repeated as needed.

Note that the reproduction/display apparatus shown in FIG. 29 can send video data to the digital TV broadcast reception/display apparatus shown in FIG. 19 via the digital data interface (DIF) 54 shown in FIGS. 19 and 29.

In this manner, the technique for transmitting main information, and image (video), sound, and system data of sub information using MPEG2/MPEG4 multiplexed datastream can be applied not only to the digital TV broadcast reception/display apparatus of the first embodiment but also to storage media such as a DVD and the like and a reproduction/display apparatus that uses the storage media.

Other Embodiments

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

inputting means for inputting a data stream of MPEG 2;

detecting means for detecting a data stream of MPEG 4 inserted into the data stream of MPEG 2;

separating means for separating the data stream of MPEG2 and/or the data stream of MPEG 4 to a plurality of data;

decoding means for decoding the separated data; and controlling means for controlling at least reproduction of image data decoded by said decoding means based on a result of said detecting means.

2. The apparatus according to claim 1, wherein said inputting means inputs the data stream of MPEG 2 which is broadcasted as a digital television broadcast.

3. The apparatus according to claim 1, wherein said inputting means inputs the data stream of MPEG 2 which is reproduced from a data storage medium.

4. The apparatus according to claim 1, further comprising instruction inputting means for manualy inputting a instruction to be supplied to said controlling means so as to instruct a reproduction method of at least decoded image data.

5. The apparatus according to claim 1, wherein the data stream of MPEG 4 includes sound data and system data, and said controlling means controls reproduction of the decoded image data and/or decoded sound data in accordance with decoded system data.

6. The apparatus according to claim 1, wherein the data stream of MPEG 4 is inserted into an adaptation field of the data stream of MPEG 2.

7. The apparatus according to claim 6, wherein the data stream of MPEG 4 is ignored by an apparatus which has no decoder for MPEG 4.

8. An image processing method comprising the steps of:

inputting a data stream of MPEG 2;

detecting a data stream of MPEG 4 inserted into the data stream of MPEG 2;

separating the data stream of MPEG2 and/or the data stream of MPEG 4 to a plurality of data;

decoding the separated data; and controlling at least reproduction of image data decoded by said decoding means based on a result of the detection.

9. The method according to claim 8, wherein said inputting step inputs the data stream of MPEG 2 which is broadcasted as a digital television broadcast.

10. The method according to claim 8, wherein said inputting step inputs the data stream of MPEG 2 which is reproduced from a data storage medium.

11. The method according to claim 8, further comprising the step of manualy inputting a instruction to be supplied to said controlling step so as to instruct a reproduction method of at least decoded image data.

12. The method according to claim 8, wherein the data stream of MPEG 4 includes sound data and system data, and said controlling step controls reproduction of the decoded image data and/or decoded sound data in accordance with decoded system data.

13. The method according to claim 8, wherein the data stream of MPEG 4 is inserted into an adaptation field of the data stream of MPEG 2.

14. The method according to claim 13, wherein the data stream of MPEG 4 is ignored by an apparatus which has no decoder for MPEG 4.

15. A computer program product comprising a computer readable medium having a computer program code, for an image processing, said product comprising:

input process procedure code for inputting a data stream of MPEG 2;

detection process procedure code for detecting a data stream of MPEG 4 inserted into the data stream of MPEG 2;

separation process procedure code for separating the data stream of MPEG2 and/or the data stream of MPEG 4 to a plurality of data;

decoding process procedure code for decoding the separated data; and control process procedure code for controlling at least reproduction of image data decoded by said decoding process procedure code based on a result of the detection.

* * * * *

UNITED STATES PATENT AND TRADEMARK OFFICE
CERTIFICATE OF CORRECTION

PATENT NO. : 6,377,309 B1
DATED : April 23, 2002
INVENTOR(S) : Masamichi Ito et al.

It is certified that error appears in the above-identified patent and that said Letters Patent is hereby corrected as shown below:

Column 1,
Line 48, "digital" should read -- Digital --.

Column 11,
Line 48, "frequency-converts" should read -- frequency converts --.

Column 17,
Line 54, "objets" should read -- objects --.

Column 21,
Line 12, "MPEG2" should read -- MPEG 2 --.
Line 26, "manualy inputting a" should read -- manually inputting an --.
Line 44, "MPEG2" should read -- MPEG 2 --.

Column 22,
Line 11, "manualy inputting a" should read -- manually inputting an --.
Line 36, "MPEG2" should read -- MPEG 2 --.

Signed and Sealed this

Twenty-third Day of July, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,377,309 B1
DATED : April 23, 2002
INVENTOR(S) : Masamichi Ito et al.

It is certified that error appears in the above-identified patent and that said Letters Patent is hereby corrected as shown below:

<u>Title page,</u>
Item [56], References Cited, U.S. PATENT DOCUMENTS, "U.S. application No. 08/315,254" should read -- U.S. application No. 08/315,245 --.

Signed and Sealed this

Sixth Day of August, 2002

*Attest:*

*Attesting Officer*

JAMES E. ROGAN
*Director of the United States Patent and Trademark Office*